(12) United States Patent
Okuno

(10) Patent No.: US 10,799,957 B2
(45) Date of Patent: Oct. 13, 2020

(54) CHUCK DEVICE

(71) Applicant: NITTAN VALVE CO., LTD., Kanagawa (JP)

(72) Inventor: Takehiro Okuno, Kanagawa (JP)

(73) Assignee: NITTAN VALVE CO., LTD., Kanagawa (JP)

( * ) Notice: Subject to any disclaimer, the term of this patent is extended or adjusted under 35 U.S.C. 154(b) by 0 days.

(21) Appl. No.: 16/340,871

(22) PCT Filed: Dec. 5, 2016

(86) PCT No.: PCT/JP2016/086076
§ 371 (c)(1),
(2) Date: Apr. 10, 2019

(87) PCT Pub. No.: WO2018/105009
PCT Pub. Date: Jun. 14, 2018

(65) Prior Publication Data
US 2019/0240743 A1 Aug. 8, 2019

(51) Int. Cl.
*B23B 31/20* (2006.01)
*B23B 41/02* (2006.01)

(52) U.S. Cl.
CPC ............ *B23B 31/201* (2013.01); *B23B 41/02* (2013.01); *B23B 2215/24* (2013.01); *Y10S 408/705* (2013.01); *Y10T 279/17529* (2015.01)

(58) Field of Classification Search
CPC ....... B23B 31/20; B23B 31/201; B23B 41/02; B23B 2215/24; B23B 2260/142;

(Continued)

(56) References Cited

U.S. PATENT DOCUMENTS

| 1,356,311 | A | * | 10/1920 | Reilly | ........................ | B23B 9/02 |
| | | | | | | 226/147 |
| 1,402,720 | A | * | 1/1922 | Bartlett | .................... | B23B 49/04 |
| | | | | | | 408/106 |
| 2,276,552 | A | * | 3/1942 | Weber, Jr. | .............. | B29D 23/14 |
| | | | | | | 279/51 |

(Continued)

FOREIGN PATENT DOCUMENTS

DE      19826885 A1   12/1999
DE   202016004635 U1 *  8/2016   ............. B23B 41/02

(Continued)

OTHER PUBLICATIONS

International Search Report and Written Opinion of the International Searching Authority issued in the corresponding Application No. PCT/JP2016/086076 dated Feb. 14, 2017.

*Primary Examiner* — Eric A. Gates
(74) *Attorney, Agent, or Firm* — Roberts Calderon Safran & Cole P.C.

(57) ABSTRACT

A machining apparatus capable of drilling a long workpiece from an end surface of a diameter-expanded part and drilling a short workpiece from an end surface of a stem part without inverting orientation of a collet and a sleeve in a chuck device is provided, as well as a method of using the same, and a chuck device for the machining apparatus. A deep hole drilling machine and a chuck device are included with a sleeve and a collet included inside the chuck device, and the collet and the sleeve each have both end openings opened toward the outside of the chuck device. The opening on one end side of each of the sleeve and the collet is directed to the deep hole drilling machine, and the collet is disposed on the other end side of the sleeve.

11 Claims, 16 Drawing Sheets

(58) Field of Classification Search
CPC ..... Y10T 279/17521; Y10T 279/17529; Y10S 408/905
See application file for complete search history.

(56) References Cited

U.S. PATENT DOCUMENTS

| | | | | |
|---|---|---|---|---|
| 2,453,642 | A * | 11/1948 | Emil | B23B 31/02 279/50 |
| 2,668,719 | A * | 2/1954 | Harmon | B23C 7/00 279/5 |
| 2,698,754 | A * | 1/1955 | Bernstein | B23B 31/207 279/51 |
| 2,736,560 | A | 2/1956 | Meibuhr | |
| RE24,903 | E * | 12/1960 | Smith | B23B 31/202 279/58 |
| 2,966,363 | A * | 12/1960 | Hendrickson | B25D 11/106 279/52 |
| 3,132,871 | A * | 5/1964 | Stewart | B23B 31/20 279/49 |
| 3,395,927 | A * | 8/1968 | Hammond | B23B 31/208 279/51 |
| 3,659,863 | A * | 5/1972 | Buttner | B23B 31/204 279/4.09 |
| 4,726,717 | A * | 2/1988 | Schmid | B23B 41/02 408/118 |
| 4,762,447 | A * | 8/1988 | Marantette | B23B 31/205 279/4.04 |
| 5,077,876 | A * | 1/1992 | McConkey | B23B 31/207 279/50 |
| 5,957,467 | A * | 9/1999 | Hornung | B23B 31/201 279/155 |
| 9,061,389 | B2 * | 6/2015 | Uchiuzo | B23B 31/20 |
| 2009/0206559 | A1 * | 8/2009 | Nguyen | B23B 29/248 279/6 |

FOREIGN PATENT DOCUMENTS

| | | |
|---|---|---|
| JP | 60-097213 U1 | 7/1985 |
| JP | 61-042208 U1 | 3/1986 |
| JP | 03-170210 A | 7/1991 |
| JP | 7204909 A | 8/1995 |
| JP | 2004-106109 A | 4/2004 |
| JP | 4227551 B | 12/2008 |
| JP | 2015036171 A | 2/2015 |

* cited by examiner

CHUCK DEVICE

CROSS-REFERENCE TO RELATED APPLICATIONS

The present application is a U.S. National Phase of PCT/JP2016/086076 filed on Dec. 5, 2016. The disclosure of the PCT Application is hereby incorporated by reference into the present Application.

TECHNICAL FIELD

The present invention relates to processing equipment, a method of using processing equipment, and a chuck device.

BACKGROUND ART

Processing equipment as disclosed in Patent Document 1 includes a drilling machine and a chuck device disposed to face the drilling machine and chucking (holding) a workpiece to be drilled by the drilling machine. Specifically, the chuck device includes therein as a collet chuck a tubular sleeve and a collet fitted into the sleeve and reduced in diameter by movement relative to the sleeve, and the collet and the sleeve are arranged close to the drilling machine side inside the chuck device. The collet and the sleeve in this chuck apparatus each have both end openings opened toward the outside of the chuck apparatus such that the opening on one end side of each of the collet and the sleeve is directed to the drilling machine, and the orientations of the collet and the sleeve can be inverted based on an inverting mechanism included in the chuck apparatus.

According to this processing equipment, when drilling a long workpiece, the long workpiece can be inserted from the openings on one end side of the collet and the sleeve so that the long workpiece can be chucked in a penetrating state through the chuck device, and the drilling machine can perform drilling not only for a short workpiece but also for the long workpiece. Moreover, since the orientation of the collet and the sleeve can be inverted, if the workpiece chucked in the penetrating state through the chuck device is inverted, the workpiece can be drilled not only from one end but also from the other end side.

In terms of shape, shaft-shaped workpieces may include a stem part and a diameter-expanded part integrally disposed at one end portion of the stem part and expanded in diameter as compared to the stem part. Regarding workpieces having such a shape, it may be required to perform the drilling of a long workpiece from an end surface of the diameter-expanded part and the drilling of a short workpiece from an end surface of the stem part. In such a case, when the processing equipment described above is used, the requirement can be satisfied in terms of the processing of the workpieces by using the chuck function and the inverting function.

PRIOR ART DOCUMENT

Patent Document

Patent Document 1: Japanese Patent No. 4227551

SUMMARY OF THE INVENTION

Problem to be Solved by the Invention

However, when a short workpiece is drilled from the end surface of the stem part in the processing equipment described above, the orientation of the collet and the sleeve in the chuck device must be inverted so that the end surface of the stem part of the short workpiece faces the drilling apparatus, and at the time of inversion, not only a free space is required for avoiding interference with other peripheral apparatuses, but also structures capable of following the inversion of the orientation of the collet and the sleeve must be prepared for wirings, pipings, etc. for the chuck device. Moreover, when the orientation of the collet and the sleeve is inverted, an inverting operation and a setting operation are required, which inevitably increases the burden on the operator.

The present invention was conceived in view of the situations and a first object thereof is to provide processing equipment, when drilling workpieces each including a stem part and a diameter-expanded part integrally disposed at one end portion of the stem part and expanded in diameter as compared to the stem part, capable of drilling a long workpiece from an end surface of the diameter-expanded part and drilling a short workpiece from an end surface of the stem part without inverting the orientation of the collet and the sleeve in the chuck device.

A second object is to provide a method of using processing equipment used in the processing equipment.

A third object is to provide a chuck device used in the processing equipment.

Means for Solving Problem

To achieve the first object, the present invention employs the following configurations (1) to (10).

(1) In processing equipment comprising a drilling machine; and a chuck device disposed to face the drilling machine and chucking a workpiece to be drilled by the drilling machine, the chuck device including as a collet chuck a tubular sleeve inside and a collet fitted into the sleeve and reduced in diameter by movement relative to the sleeve, the collet and the sleeve each having both end openings opened toward the outside of the chuck device, the opening on one end side of each of the sleeve and the collet is directed to the drilling machine, and the collet is disposed on the other end side of the sleeve.

According to this configuration, regarding a long workpiece out of workpieces each including a stem part and a diameter-expanded part integrally disposed at one end portion of the stem part and expanded in diameter as compared to the stem part, the long stem part of the workpiece can be inserted into the collet from the opening on the one end side of the sleeve on the side closer to the drilling machine so as to utilize the facts that both ends of each of the collet and the sleeve are opened to the outside of the chuck device and that the stem part of the workpiece is long, and therefore, the long stem part can be chucked to the collet separated from the drilling machine through the relative movement between the collet and the sleeve. In this case, since an end surface of the diameter-expanded part of the workpiece faces the drilling machine, the drilling can be performed from the end surface of the diameter-expanded part.

On the other hand, regarding a short workpiece of the workpieces, when the short stem part thereof is inserted into the collet from the opening on the other end side of the sleeve on the farther side with respect to the drilling machine, the short stem part of the workpiece can be chucked to the collet through relative movement between the collet and the sleeve by utilizing the arrangement position of the collet in the sleeve even though the stem part of the workpiece is short. In this case, since the drilling machine can be moved into the sleeve from the opening on the one end side thereof by utilizing the fact that the openings at both ends of each of the collet and the sleeve are opened to the outside of the chuck device, the drilling can be performed on the end surface of the stem part of the workpiece without inverting the orientation of the collet and the sleeve in the chuck device.

(2) Under the configuration of (1),
the other end of the sleeve is made closer to a portion of an outer surface of the chuck device located on the farther side as compared to a portion located on the side closer to the drilling machine in an axial direction of the sleeve.

According to this configuration, the collet can be made closer to the portion located on the farther side as compared to the portion located on the side closer to the drilling machine, and even if the stem part of the short workpiece is considerably short, the short stem part can be inserted from the opening on the other end side of the sleeve and thereby can properly be chucked to the collet.

(3) Under the configuration of (2),
the chuck apparatus includes a chuck device main body incorporating the collet chuck and a pressing device disposed for the collet in the chuck device main body on the outside of the other end side of the collet, and
the pressing apparatus is set to be able to move closer to and away from the collet and is set to relatively move the collet and the sleeve by moving closer to the collet to press the collet or the sleeve when the collet is reduced in diameter.

According to this configuration, since the pressing device moving closer to and away from the collet is used as a driving means relatively moving the collet and the sleeve, it is no longer necessary to dispose a complicated and precise hydraulic circuit etc. inside the chuck device main body as the drive means relatively moving the collet and the sleeve, and the configuration of the chuck device can be simplified.

Furthermore, since the drive means relatively moving the collet and the sleeve is not disposed inside the chuck device main body and the pressing device is disposed outside the chuck device main body as the drive means, the length of the chuck device main body can be made shorter in the axial direction of the collet as compared to when the drive means is disposed inside the chuck device main body (e.g., the device described in Patent Document 1), and the amount of entry of the drilling machine into the chuck device main body (inside the sleeve) can be reduced when the drilling is performed from the end surface of the stem part of the short workpiece. Therefore, the drilling machine (cutting tool) reduced by the amount of entry is usable, so that a deflection suppression effect on the drilling machine (cutting tool) can be enhanced. Consequently, when the deep hole drilling is performed in the workpieces, a machined hole can be restrained from being formed in a run-out state, and a highly accurate hole can be formed as the machined hole.

(4) Under the configuration of (3),
the chuck device main body includes a tubular main body such that the axial direction of the tubular main body faces in the axial direction of the collet,
the sleeve is attached in the tubular main body such that the other end side of the sleeve faces the pressing device,
the collet is fitted in the other end side of the sleeve such that the other end side of the collet faces the pressing device,
an inner circumferential surface of the sleeve is expanded in diameter from the one end side toward the other end side of the sleeve,
an outer circumferential surface of the collet is expanded in diameter from the one end side toward the other end side of the collet, and
the pressing device is set to press the collet to relatively move the collet and the sleeve when the collet is reduced in diameter.

According to this configuration, while the stem part of the workpiece can be chucked to the collet by pressing the collet with the pressing device, the collet can reliably and easily be attached to and detached from the sleeve on the other end side of the sleeve based on the shapes of the inner circumferential surface of the sleeve and the outer circumferential surface of the collet, and the collet can easily be replaced with a more preferable collet according to the workpiece.

(5) Under the configuration of (4),
a locking member is disposed on a circumferential edge portion of the opening on the other end side of the collet,
one end side of a cylindrical member is slidably interposed between the outer circumferential surface on the other end side of the sleeve and the inner circumferential surface of the tubular main body such that the other end side of the cylindrical member is projected outside the other end side of the sleeve,
on an inner circumferential surface on the other end side of the cylindrical member, a diameter-reduced portion is formed such that the inner diameter on the other end side of the cylindrical member is reduced as compared to the inner diameter on the one end side of the cylindrical member,
the diameter-reduced portion is provided with a contacting surface brought into contact with an outer circumferential edge portion of the other end surface of the collet, and a restricting hook portion engaged with the locking member under a state in which the contacting surface is in contact with the outer circumferential edge portion of the other end surface of the collet to prevent relative displacement between the collet and the cylindrical member in the axial direction of the collet, and
an urging means urging the diameter-reduced portion of the cylindrical member in a direction away from the other end surface of the sleeve is interposed between one end surface of the cylindrical member and the tubular main body.

According to this configuration, at the time of processing of a short workpiece out of workpieces each including a stem part and a diameter-expanded part integrally disposed at one end portion of the stem part and expanded in diameter as compared to the stem part, even if the diameter of the diameter-expanded part of the workpiece is large, the outer diameter of the other end surface of the cylindrical member can be made larger so that the other end surface of the cylindrical member can be pressed by the pressing device, and the collet can be retracted with respect to the sleeve by pressing against the other end surface of the cylindrical member to properly reduce the diameter of the collet (chucking of the workpiece stem part).

On the other hand, when the pressing device does not press the other end surface of the cylindrical member, the collet is projected outward from the other end side of the sleeve by the urging force of the urging means, so that not only the cylindrical member can easily be gripped, but also the collet can easily be pulled out by withdrawing the cylindrical member to the outside. Therefore, the collet can easily be replaced.

(6) Under the configuration of (1),
to one end surface of the sleeve, either a first annular member having a through-hole reduced in diameter as compared to a diameter of a shaft-shaped workpiece and a second annular member having a through-hole enlarged as compared to a diameter of a shaft-shaped workpiece is selectively detachably attached,
a member used as the first annular member allows the through-hole of the first annular member to face the opening on the one end side of the collet and has a positioning tubular portion disposed in a projecting manner in a circumferential edge portion of the through-hole of the first annular member to allow the positioning tubular portion to enter the inside of the sleeve from the one end side of the sleeve, and
a member used as the second annular member allows the through-hole of the second annular member to face the opening on the one end side of the collet and has a recess formed on the outer surface side of the second annular member and spreading around the through-hole of the annular member with an inner surface of the recess inclined such that a diameter is expanded toward the outside in the axial direction of the through-hole.

According to this configuration, when the short stem part of the short workpiece is inserted into the sleeve from the opening on the other end side thereof while the first annular member is used, the end surface of the stem part can be brought into contact with a leading end surface of the positioning tubular portion, and the short workpiece can be positioned with respect to the collet. When the long stem part of the long workpiece is inserted into the sleeve from the opening on the one end side while the second annular member is used, a back surface of a head part can be brought into contact with the inner surface of the recess, and the long workpiece can be positioned with respect to the collet. Therefore, in either case, the drilling is performed on the positioned workpiece by the drilling machine, so that the drilling can be made with highly accurate.

Since the first and second annular members are selectively detachably attached to the one end surface of the sleeve, the optimum annular member (first or second annular member) corresponding to the workpiece can be selected and the annular member can easily be attached to the one end surface of the sleeve.

(7) Under the configuration of (6),
a recess spreading around the through-hole of the first annular member is formed on the outer surface side of the first annular member, and
the recess has an inner surface inclined such that a diameter is expanded from the positioning tubular portion toward the outer surface side of the annular member in the axial direction of the through-hole.

According to this configuration, even if cutting chips are generated when drilling is performed on the short workpiece from the end surface of the stem part thereof, the cutting chips can easily be discharge to the outside through a guiding action of the inner surface of the recess.

(8) Under the configuration of (6),
when the second annular member is attached to the one end surface of the sleeve, a long collet having the axial length of the collet made longer than a standard length is incorporated in the sleeve as the collet, and
one end surface of the long collet is located on the inner surface side of the second annular member beyond a center portion in the axial direction of the sleeve.

According to this configuration, the long collet can chuck the long stem part of the long workpiece over a long range, and when the drilling is performed on the long workpiece, the run-out of the long stem part can highly reliably be prevented. Therefore, the accuracy of the drilling on the long workpiece can be enhanced.

(9) Under the configuration of (4),
the tubular main body is set to be rotationally driven around the axis of the tubular main body, and
the pressing apparatus includes a moving body capable of moving closer to and away from the collet, and a pressing member supported by the moving body rotatably in an area facing the collet.

According to this configuration, even when the workpiece is rotated during the drilling, the rotation is absorbed by the relative rotation of the pressing member with respect to the moving body, so that the pressing device can properly be used for the drilling without interfering with the rotation of the workpiece.

(10) Under the configuration of (5),
the cylindrical member is made up of a cylindrical main body having one end side slidably inserted between the outer circumferential surface on the other end side of the sleeve and the inner circumferential surface of the tubular main body and the other end side projected outside from the other end surface of the sleeve, and an annular lid detachably attached to the other end surface of the cylindrical main body,
a stopper is attached to the tubular main body so that when the other end side of the cylindrical main body exceeds a predetermined projection amount with respect to the other end surface of the sleeve, the stopper engages with the cylindrical main body to restrict movement of the cylindrical main body, and
the annular lid serves as the diameter-reduced portion to constitute the contacting surface and the restricting hook portion.

According to this configuration, by removing the annular lid, only the collet can be pulled out from the sleeve while leaving the cylindrical main body and the urging means inside the tubular main body, so that the removal and assembly works of the collet can significantly be improved.

To achieve the second object, the present invention employs the following configurations (11) to (14).

(11) Under processing equipment including a drilling machine and a chuck device disposed to face the drilling machine and chucking a workpiece to be drilled by the drilling machine with the chuck device including therein as a collet chuck a tubular sleeve and a collet fitted into the sleeve and reduced in diameter by movement relative to the sleeve and with the collet and the sleeve each having both end openings opened toward the outside of the chuck device such that the opening on one end side of each of the collet and the sleeve is directed to the drilling machine and that the collet is disposed on the other end side of the sleeve,
a workpiece including a stem part and a diameter-expanded part integrally disposed at one end portion of the stem part and expanded in diameter as compared to the stem part is prepared as the workpiece;
when the stem part of the workpiece is shorter than the axial length of the sleeve and drilling is performed from the other end surface of the stem part of the workpiece, the stem part of the workpiece is inserted into the collet from the opening on the other end side of the collet so that the stem part of the workpiece is held with the collet through relative movement between the collet and the sleeve; and when the stem part of the workpiece is longer than the axial length of the sleeve and drilling is performed from an end surface of the diameter-expanded part of the workpiece, the stem part of the workpiece is inserted into the collet from the opening on the one end side of the collet so that the stem part of the workpiece is held with the collet through relative movement between the collet and the sleeve.

According to this configuration, regarding a long workpiece of the workpieces, the long stem part thereof can properly be chucked to the collet by utilizing the facts that the openings at both ends of each of the collet and the sleeve are opened to the outside of the chuck device and that the stem part of the workpiece is long and, in this case, since an end surface of the diameter-expanded part of the workpiece faces the drilling machine, the drilling can be performed on the end surface of the diameter-expanded part.

Regarding a short workpiece of the workpieces, the short stem part thereof can properly be chucked to the collet by utilizing the arrangement position of the collet in the chuck device and, in this case, by utilizing the fact that the openings at both ends of each of the collet and the sleeve are opened to the outside of the chuck device, the drilling machine can be moved into the sleeve to perform the drilling on the end surface of the stem part of the workpiece even without inverting the orientation of the collet and the sleeve in the chuck device.

(12) Under the configuration of (11), when the stem part of the workpiece is shorter than the axial length of the sleeve and drilling is performed from the other end surface of the stem part of the workpiece, an annular member having a tubular portion projected from a circumferential edge portion of a through-hole of the annular member is prepared as a means of positioning the workpiece with respect to the collet, and after the annular member is attached to one end surface of the sleeve and the tubular portion of the annular member is moved into the sleeve, the stem part of the workpiece is inserted from the opening on the other end side of the collet to bring the other end surface of the stem part of the workpiece into contact with the end surface of the tubular portion.

According to this configuration, even when the workpiece is a short workpiece, an insertion state of the short workpiece can be determined with respect to the collet, and the short workpiece can be chucked in a predetermined positional state in the collet. Therefore, the drilling on the short workpiece can properly be performed.

(13) Under the configuration of (11), when the stem part of the workpiece is longer than the axial length of the sleeve and drilling is performed from the end surface of the diameter-expanded part of the workpiece, an annular member having a circumferential edge portion of a through-hole of the annular member constituting a receiving surface receiving the diameter-expanded part of the workpiece is prepared as a means of positioning the workpiece with respect to the collet, the annular member is attached to one end surface of the sleeve such that the receiving surface of the annular member faces outward, and the stem part of the workpiece is then inserted into the collet through the through-hole of the annular member and the opening on the one end side of the sleeve to bring the diameter-expanded part of the workpiece into contact with the receiving surface of the annular member.

According to this configuration, an insertion state of the long workpiece can be determined with respect to the collet by the receiving surface of the annular member, and the long workpiece can be chucked in a predetermined position state in the collet. Therefore, the drilling on the long workpiece can properly be performed.

(14) Under the configuration of (13), a long collet having an axial length longer than a standard length is prepared as the collet, and the long collet is incorporated in the sleeve such that one end surface of the long collet is made closer to an inner surface of the annular member beyond a center portion in the axial direction of the sleeve.

According to this configuration, the long collet chucks the long stem part of the long workpiece over a long range, and when the drilling is performed on the long workpiece, the run-out of the long stem part can highly reliably be prevented. Therefore, the accuracy of the drilling on the long workpiece can be enhanced.

To achieve the third object, the present invention employs the following configurations (15) to (18).

(15) A chuck device comprising: a tubular main body having one axial end surface defined as a facing end surface facing a drilling machine; a sleeve disposed in the tubular main body with an axial direction aligned with the axial direction of the tubular main body; and a collet fitted in the sleeve with an axial direction aligned with the axial direction of the sleeve, the collet and the sleeve having both end openings opened toward the outside of both axial ends of the tubular main body, the opening on one end side of each of the sleeve and the collet is directed to an opening of the facing end surface, and the collet is disposed on the other end side of the sleeve.

According to this configuration, a preferable chuck device used in the processing equipment according to the configuration of (1) can be provided.

(16) Under the configuration of (15), the other end of the sleeve is made closer to the other axial end surface of the tubular main body than the one axial end surface of the tubular main body in the axial direction of the sleeve.

According to this configuration, a preferable chuck device used in the processing equipment according to the configuration of (2) can be provided.

(17) Under the configuration of (16), the chuck device comprises a chuck device main body incorporating the main body, the collet, and the sleeve, and a pressing device disposed for the collet in the chuck device main body on the outside of the other end side of the collet, and the pressing device is set to be able to move closer to and away from the collet and is set to relatively move the collet and the sleeve by moving closer to the collet to press the collet or the sleeve when the collet is reduced in diameter.

According to this configuration, a preferable chuck device used in the processing equipment according to the configuration of (3) can be provided.

(18) Under the configuration of (17),
the tubular main body is set to be rotationally driven around the axis of the main body, and
the pressing device includes a moving body capable of moving closer to and away from the collet, and a pressing member supported by the moving body rotatably in an area facing the collet.

According to this configuration, even though the workpiece is rotated, the rotation is absorbed for the pressing device by the relative rotation of the pressing member with respect to the moving body, so that the pressing device can be prevented from interfering with the rotation of the workpiece.

Effect of the Invention

From the above, the present invention can provide the processing equipment, when drilling workpieces each integrally including a stem part and a diameter-expanded part expanded in diameter as compared to the stem part, capable of drilling a long workpiece from an end surface of the diameter-expanded part and drilling a short workpiece from an end surface of the stem part without inverting the orientation of the collet and the sleeve in the chuck device.

The method of using processing equipment and the chuck device used in the processing equipment can also be provided.

MODES FOR CARRYING OUT THE INVENTION

Embodiments of the present invention will now be described with reference to the drawings.

Figure 1:
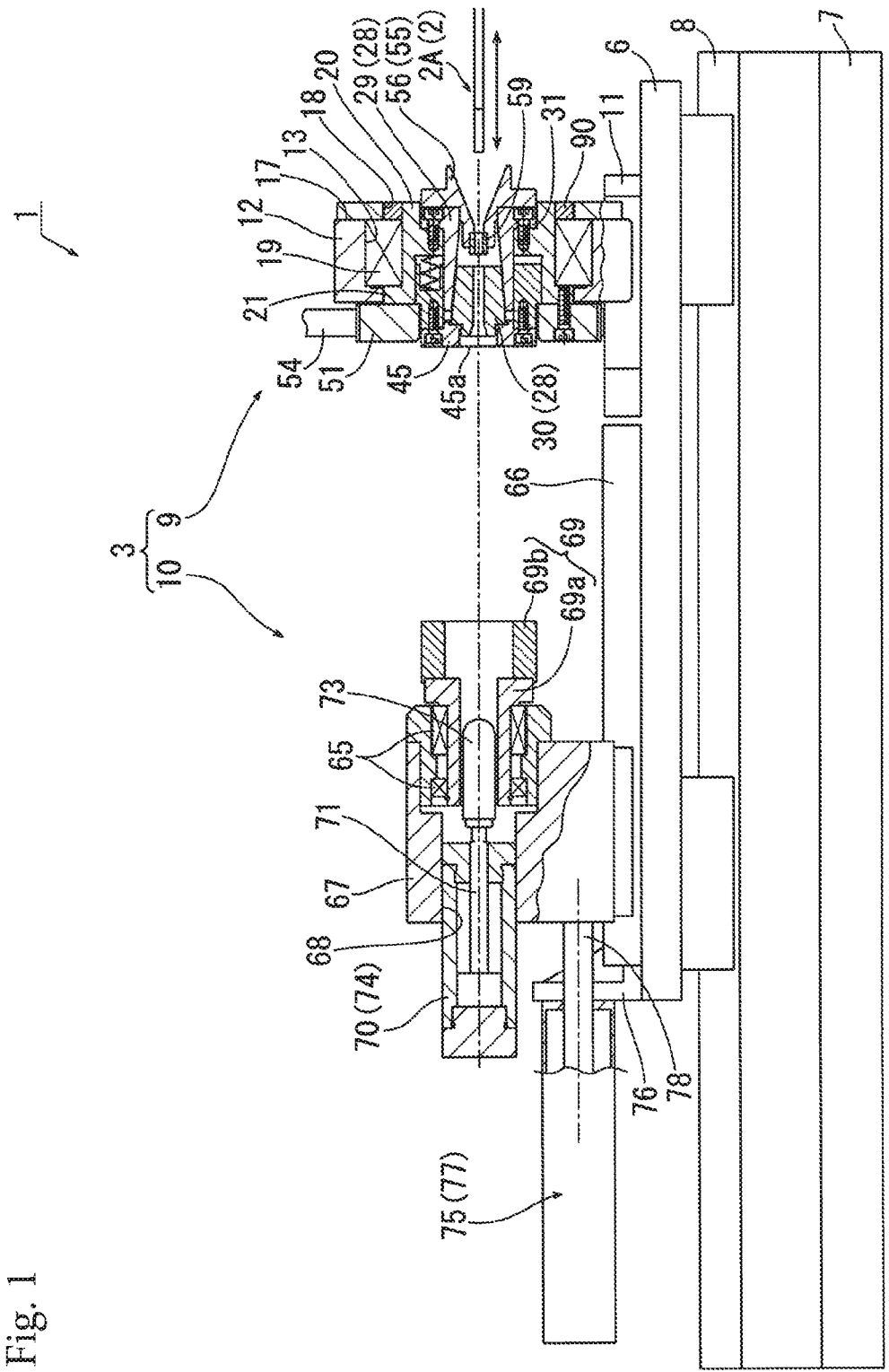
FIG. 1 is an overall view of processing equipment according to an embodiment.
Figure 2:
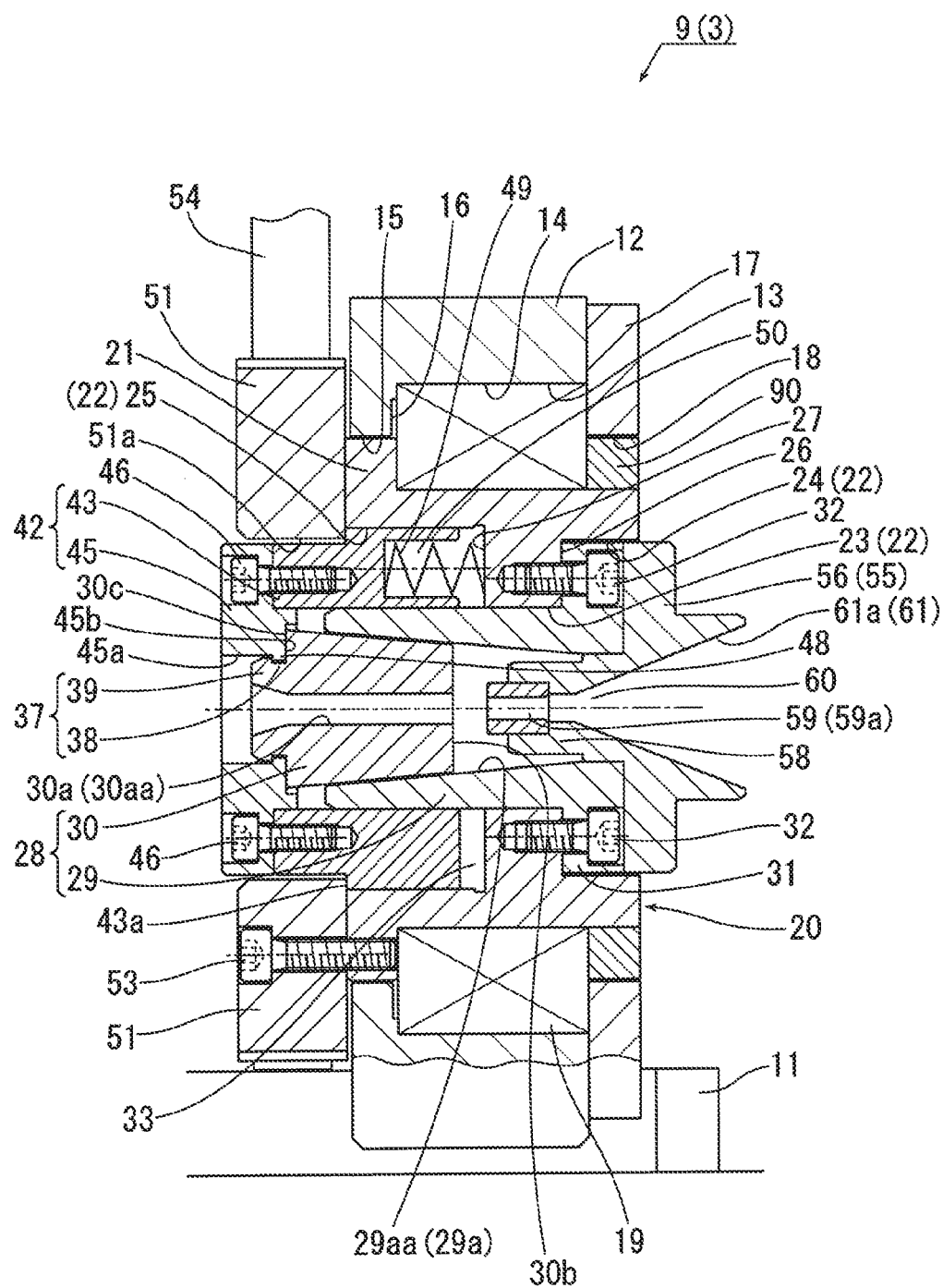
FIG. 2 is a longitudinal sectional view of a chuck device main body used in the processing equipment according to the embodiment.

In FIGS. 1 and 2, reference numeral 1 denotes processing equipment according to an embodiment. This processing equipment 1 has a deep hole drilling machine 2 (shown as a gun drill 2A described later) serving as a drilling machine, and a chuck device 3 chucking (holding) a workpiece to be deep-hole drilled by the deep hole drilling machine 2, and the deep hole drilling machine 2 and the chuck device 3 are arranged in a facing state so that deep hole drilling can be performed for the workpiece.

Figure 3:
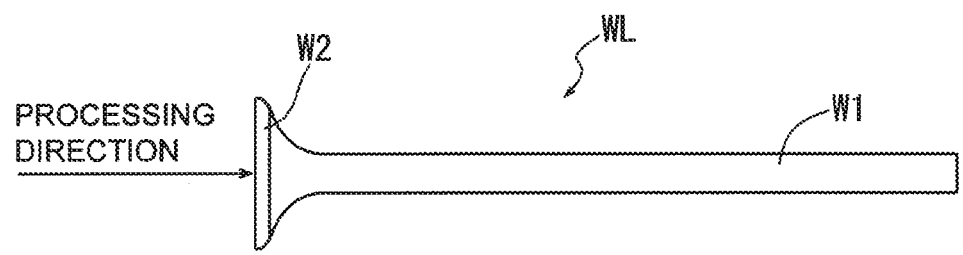
FIG. 3 is an explanatory view for explaining a long workpiece (valve).
Figure 4:
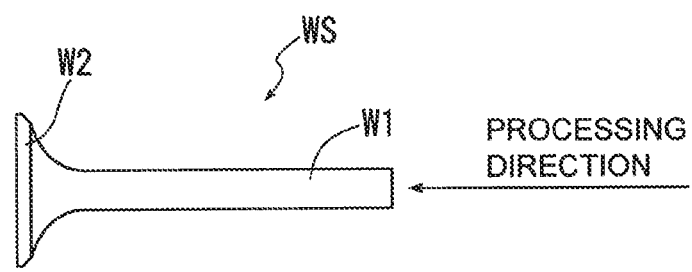
FIG. 4 is an explanatory view for explaining a short workpiece (valve).

As shown in FIGS. 3 and 4, the processing equipment 1 has two types of workpieces WL, WS as objects to be processed. The two types of the workpieces WL, WS are common to each other in terms of a valve shape including a stem part W1 and a head part (diameter-expanded part) W2 integrated at one end portion of the stem part W1 and expanded in diameter as compared to the stem part W1, while the workpieces WL, WS are different in axial length of the stem part W1, so that the two types of workpieces WL, WS are configured as a long workpiece WL and a short workpiece WS based on the difference in the axial length. Specifically, the long workpiece WL is already formed as a finished product shape, and the deep hole drilling is performed for the long workpiece WL from an end surface of the head part W2 toward the stem part W1. The short workpiece WS is not yet formed as a finished product shape, and the deep hole drilling is performed for the short workpiece WS from an end surface of the stem part W1 toward the head part W2. Regarding the short workpiece WS, another stem member is subsequently joined to the stem part W1 so that the finished product shape is achieved.

As shown in FIG. 1, the deep hole drilling machine 2 constituting the processing apparatus 1 has a structure including the gun drill 2A in a positionally-fixed apparatus main body (not shown). The gun drill 2A has a shaft shape as known, and the gun drill 2A is disposed such that the axial direction thereof is a horizontal direction with a leading end portion (cutting edge portion) facing the chuck device 3. The gun drill 2A is capable of independently advancing toward and retreating from the chuck device 3, and the deep hole drilling is performed on the workpiece WL or WS chucked by the chuck device 3 based on the advancing/retreating movement of the gun drill 2A.

Figure 12:
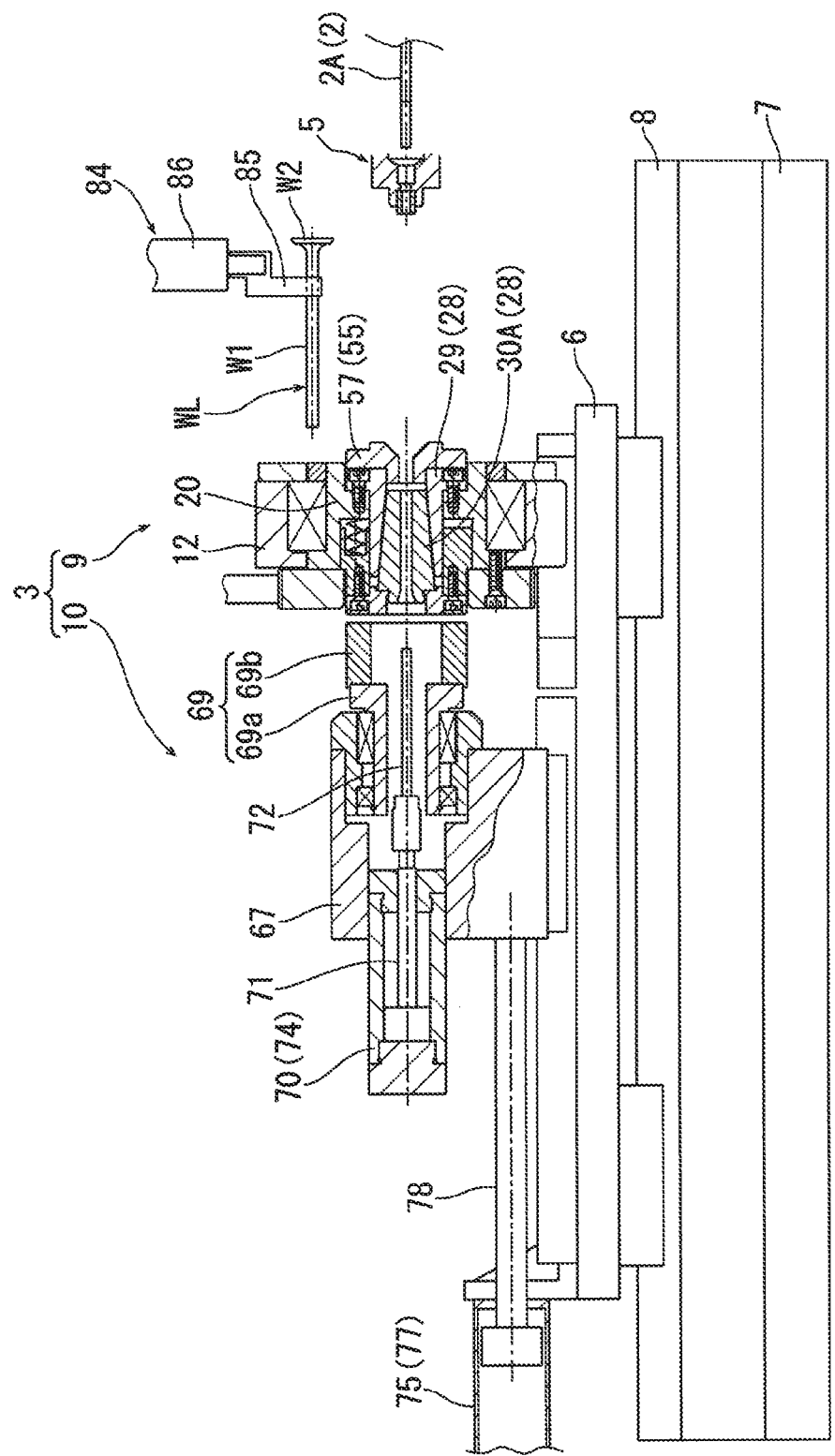
FIG. 12 is an operation explanatory view for explaining an operation of deep hole drilling of the long workpiece using the processing equipment according to the embodiment.
Figure 13:
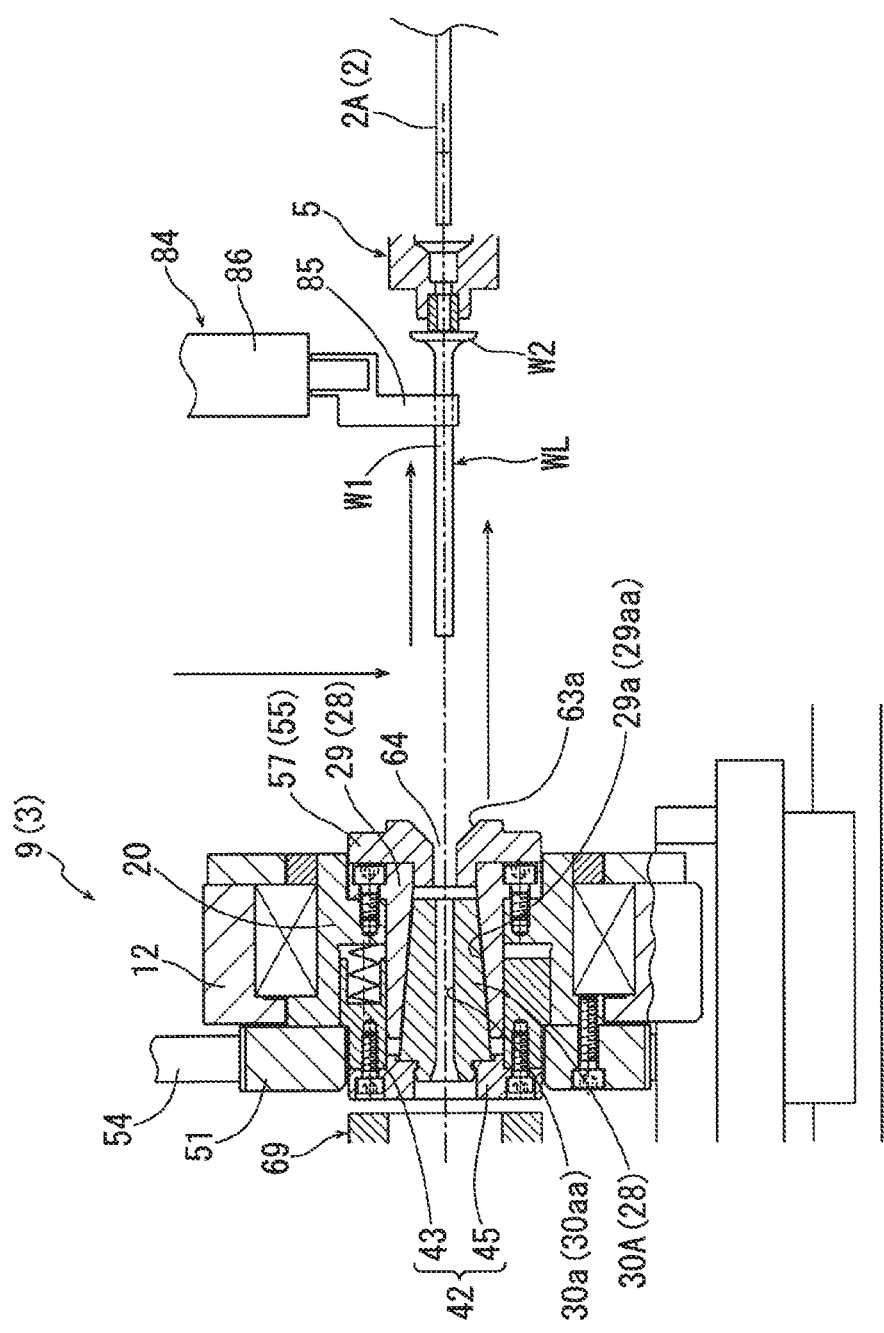
FIG. 13 is an operation explanatory diagram for explaining a continuation from FIG. 12.

Various accessories can be attached to this deep hole drilling machine 2. In this embodiment, when the deep hole drilling is performed on the long workpiece WL, a drill bush 5 is attached to an apparatus main body of the deep hole drilling machine 2 as shown in FIGS. 12, 13, etc., described later and the end surface of the head part W2 of the long workpiece WL is brought into contact with the drill bush 5, so that the gun drill 2A performs the deep hole drilling on the long workpiece WL through the drill bush 5.

As shown in FIG. 1, the chuck device 3 constituting the processing equipment 1 is disposed on a slide base 6. The slide base 6 is slidably supported by a pair of guide rails 8 (only one guide rail is shown in FIG. 1 etc.) disposed on a base 7. On the base 7, the pair of the guide rails 8 extends in a parallel arrangement direction (right-left direction in FIG. 1) of the chuck device 3 and the deep hole drilling machine 2, and the slide base 6 can be guided by the pair of the guide rails 8 to move closer to and away from the deep hole drilling machine 2. A reciprocating drive source not shown is linked to the slide base 6 so that the slide base 6 is driven by driving the reciprocating drive source, and the chuck device 3 is accordingly moved closer to and away from the deep hole drilling machine 2.

As shown in FIG. 1, the chuck device 3 includes a chuck device main body 9 and a pressing device 10 on the slide base 6. The chuck device main body 9 is disposed on one side (the right side in FIG. 1) of the slide base 6, which is the side closer to the deep hole drilling machine 2, and the pressing device 10 is disposed on the other side (the left side in FIG. 1) of the slide base 6 relative to the chuck device main body 9.

Figure 6:
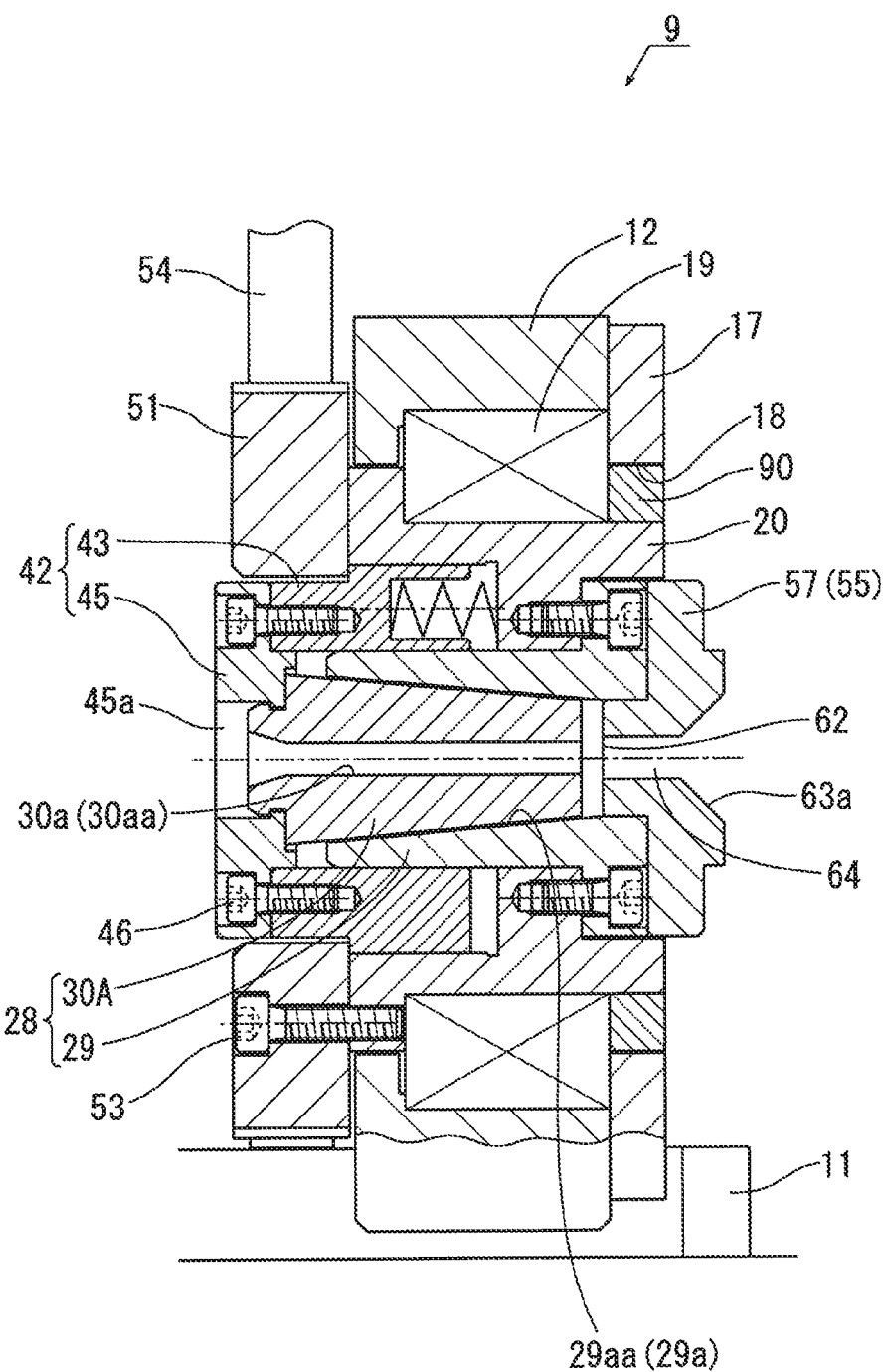
FIG. 6 is a longitudinal sectional view of a state in which a long collet and a second annular member are used in the chuck device main body according to the embodiment.

Under a basic structure, a component part to be attached to the basic structure is switched so that the chuck device main body 9 uniquely holds each of the short workpiece WS and the long workpiece WL, and FIGS. 1 and 2 show the chuck device main body 9 to which the component part for holding the short workpiece WS is attached, while FIG. 6 shows the chuck device main body 9 to which the component part for holding the long workpiece WL is attached. First, description will be made of the chuck device main body 9 to which the component part for holding the short workpiece WS is attached.

As shown in FIGS. 1 and 2, the chuck device main body 9 includes a housing 12 disposed on the slide base 6 via a base 11. The housing 12 has a constant width in a slide direction of the slide base 6 (left-right direction in FIGS. 1 and 2), and a stepped through-hole 13 having a circular cross section is formed in the housing 12 in a penetrating state in the slide direction of the slide base 6 (the width direction of the housing 12). The through-hole 13 forms a first inner circumferential surface 14 having a larger hole diameter from one end surface in the width direction (a right end surface in FIGS. 1 and 2) of the housing 12 forming the side closer to the deep hole processing machine 2 to the vicinity of the other end surface (a left end surface in FIGS. 1 and 2) and forms a second inner circumferential surface 15 reduced in hole diameter as compared to the hole diameter in the vicinity of the other end surface in the width direction of the housing 12, and a stepped surface 16 is formed between the first inner circumferential surface 14 and the second inner circumferential surface 15. A cover part 17 is detachably attached to the one end surface in the width direction of the housing 12. The cover part 17 has a large hole 18 at a center portion thereof, and the opening on the one end side in the width direction of the housing 12 is covered with the cover part 17.

As shown in FIGS. 1 and 2, a cylindrical-shaped rotating body (tubular main body) 20 is fitted in the housing 12 via a bearing 19 on the first inner circumferential surface 14.

The bearing 19 is fitted and held on the first inner circumferential surface 14 with the axial direction thereof oriented in the axial direction of the through-hole 13 of the housing 12. In the bearing 19, an outer circumferential edge portion of one end surface of the bearing 19 is brought into contact with a hole circumferential edge portion of the cover part 17, and the other end surface of the bearing 19 has an outer circumferential edge portion brought into contact with the stepped surface 16 of the housing 12.

The rotating body 20 is fitted and held on an inner circumferential surface of the bearing 19. The rotating body 20 has one end portion projecting outward slightly with respect to one end surface of the bearing 19 and extending into the hole 18 of the cover part 17, and an annular plate 90 is screwed to an outer circumferential surface of the one end portion of the rotating body 20. The annular plate 90 faces an inner circumferential edge portion of the one end surface of the bearing 19 in a state of substantially closing a space between the inner circumferential surface of the hole 18 in the cover part 17 and the outer circumferential surface of the one end portion of the rotating body 20. On the other hand, the outer circumferential surface of the other end portion of the rotating body 20 has a flange 21 integrally formed to expand toward the second inner circumferential surface 15 of the housing 12, and the flange 21 faces the inner circumferential edge portion of the other end surface of the bearing 19. As a result, the rotating body 20 is rotatable relative to the housing 12 without a displacement movement in the axial direction of the bearing 19, based on the bearing 19. A through-hole 22 of the rotating body 20 has a shortest inner diameter on an inner circumferential surface 23 in an axially inner portion, and the inner diameter is expanded in inner circumferential surfaces 24, 25 on one end side (the right end side in FIGS. 1 and 2) and the other end side (the left end side in FIGS. 1 and 2) in the axial direction as compared to the inner diameter of the axially inner portion. Therefore, a stepped surface 26 is formed between the inner circumferential surface 23 in the axially inner portion of the bearing 19 and the inner circumferential surface 24 on the one end side in the axial direction thereof, and a stepped surface 27 is formed between the inner circumferential surface 23 in the axially inner portion of the bearing 19 and the inner circumferential surface 25 on the other end side in the axial direction thereof.

As shown in FIGS. 1 and 2, a collet chuck 28 is included in the rotating body 20. The collet chuck 28 includes a tubular sleeve 29 and an expandable/contractible collet 30 incorporated in the sleeve 29, and the inner diameter of the collet 30 is expanded/contracted by relative movement between the sleeve 29 and the collet 30.

The sleeve 29 used has an axial length made slightly longer than the length in the width direction of the housing 12. The sleeve 29 has a flange 31 formed on the outer circumferential surface of one end portion thereof, and on the outer circumferential surface on the other end side from the one end portion thereof, the outer diameter thereof is maintained at a constant diameter shorter than the outer diameter of the flange. The other end side of the sleeve 29 is inserted from the opening on the one end side of the rotating body 20 so that the sleeve 29 is fitted to the inner circumferential surface 23 of the axially inner portion of the rotating body 20, and the flange 31 of the sleeve 29 is brought into contact with the stepped surface 26 of the rotating body 20. The flange 31 and the stepped surface 26 are fixed by using fasteners 32, and the sleeve 29 and the rotating body 20 are detachably integrated. As a result, an annular space 33 is formed between the outer circumferential surface on the other end side of the sleeve 29 and the inner circumferential surface on the other end side of the rotating body 20, and the annular space 33 is opened toward the outside on the other end side in the width direction of the housing 12. The sleeve 29 has a through-hole 29a extending through the entire axial length therein, and an inner circumferential surface 29aa formed by the through-hole 29a is formed such that the diameter is expanded from the one end side toward the other end side thereof, and the other end opening of the sleeve 29 (the through-hole 29a) is opened to the outside.

As shown in FIGS. 1 and 2, the collet 30 is incorporated in the sleeve 29 on the other end side of the sleeve 29. The collet 30 is made up of a plurality of expanding/contracting pieces into a cylindrical shape capable of expanding and contracting, and a through-hole 30a extending through the entire axial length is formed in the collet 30. Therefore, the collet 30 has one end opening facing the gun drill 2A in the deep hole drilling machine 2 through the opening on the one end side of the rotating body 20 and the opening on the one end side of the sleeve 29 and has the opening on the other end side facing the pressing device 10.

In this embodiment, the axial length of the collet 30 is set to be about half of the axial length of the sleeve 29. The collet 30 has one end surface 30b positioned near the center in the axial direction of the sleeve 29, and the other end side of the collet 30 is projected slightly outward from the other end surface of the sleeve 29.

The inner circumferential surface 30aa of the collet 30 has the inner diameter set such that the stem part W1 of the short workpiece WS can be inserted over the entire length when no external force acts from the radially outer side to the radially inner side of the collet 30, while the outer circumferential surface of the collet 30 is formed to be expanded in diameter from the one end side toward the other end side. The collet 30 has a plurality of slits therearound to form the plurality of expanding/contracting pieces, and when the collet 30 is relatively moved to one end side of the sleeve 29 to apply an external force radially inward to the collet 30, the inner diameter of the collet 30 is reduced. In this embodiment, the plurality of slits in the collet 30 is each formed over the entire length of the collet 30; however, at one end portion and the other end portion in the axial direction of the collet 30, the collet 30 has no gaps alternately formed (is not separated) entirely in the thickness direction and has coupling portions coupling the adjacent expanding/contracting pieces. Therefore, when the collet 30 relatively moves toward the one end side of the sleeve 29, the inner diameter of the collet 30 is substantially uniformly reduced as a whole in the axial direction.

Obviously, the collet 30 may be implemented by using a typical collet having a leading end side corresponding to the other end side of the collet 30 with a plurality of slits formed only on the leading end side (the other end side) such that the leading end side of the collet 30 is mainly expanded/contracted.

Figure 5:
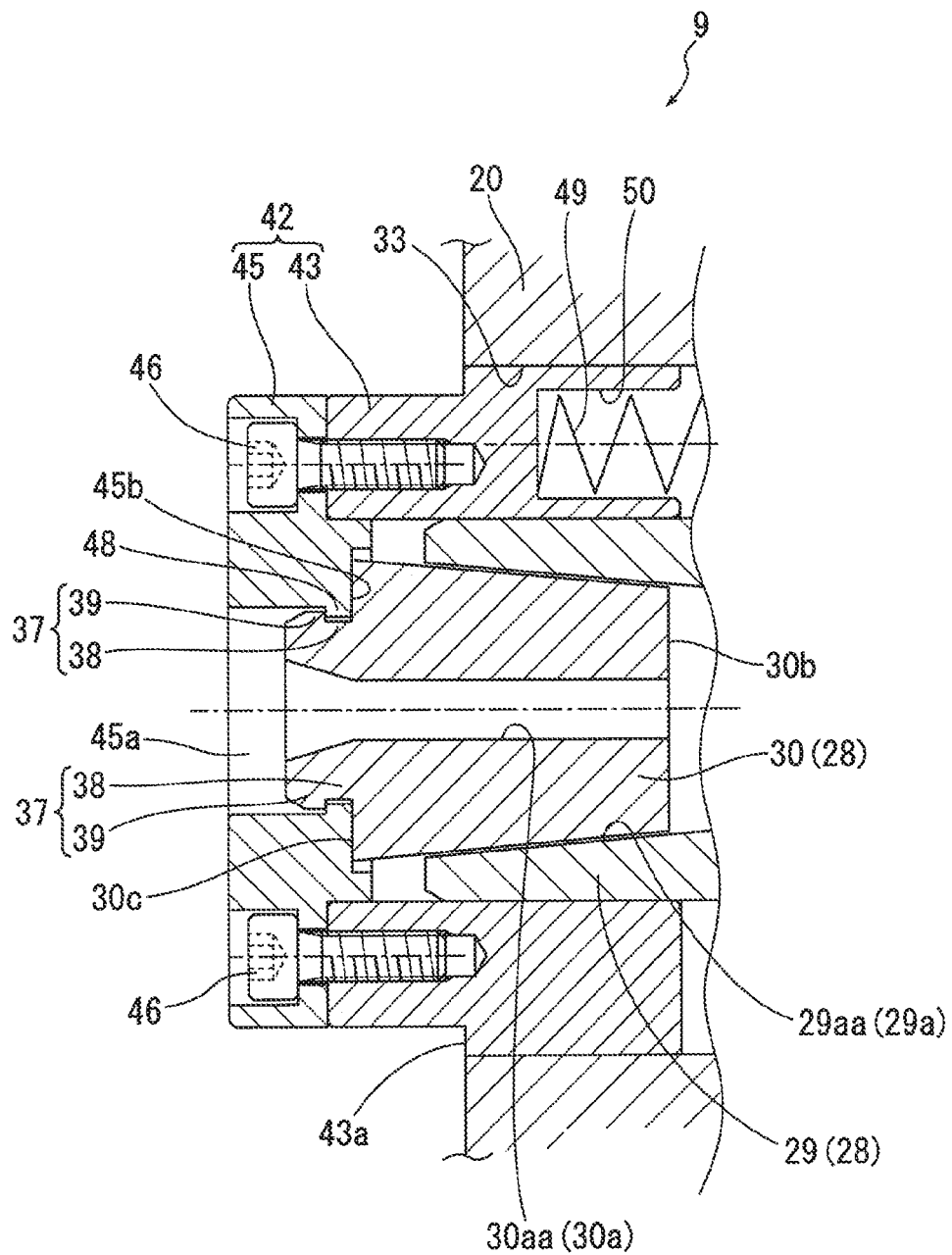
FIG. 5 is a partially enlarged longitudinal sectional view of a portion of the chuck device main body used in the processing equipment according to the embodiment.

On the other end surface 30c of the collet 30, as shown in FIG. 5, a plurality of locking members 37 are disposed adjacently to each other in the circumferential direction in a circumferential edge portion of the opening on the other end side. Each of the locking members 37 is made up of a leg part 38 extending from the circumferential edge portion of the opening on the other end side of the collet 30, and a hook portion 39 disposed at a leading end portion of the leg part 38, and the plurality of the locking members 37 forms a cylindrical shape reduced in diameter as compared to the other end surface of the collet 30 on the outside of the other end surface of the collet 30 and also forms an annular groove between the hook portions 39 of the locking members 37 and the other end surface of the collet 30.

In the annular space 33, as shown in FIGS. 1, 2, and 5, a cylindrical member 42 is fitted as a cylindrical member. The cylindrical member 42 has a divided structure made up of a cylindrical main body 43 serving as a tubular main body and a circular annular member 45 serving as an annular lid. The cylindrical main body 43 has one end side (the right end side in FIGS. 1 and 2) slidably fitted between the outer circumferential surface of the other end side of the sleeve 29 and the inner circumferential surface of the other end side of the rotating body 20, and the other end surface of the cylindrical main body 43 reaches near the other end surface of the collet 30. The circular annular member 45 is detachably attached to the other end surface of the cylindrical main body 43 by using fasteners 46, and the circular annular member 45 and the cylindrical main body 43 have a constant outer diameter over the entire outer circumferential surface in the integrated state thereof. The circular annular member 45 has a center hole 45a at the center portion thereof, and the center hole 45a serves as an insertion port for the stem part W1 of the short workpiece WS. The center hole 45a is reduced in diameter as compared to the inner diameter of the cylindrical main body 43 and, in the inner surface of the circular annular member 45, a center-hole circumferential edge portion 45b facing the other end surface of the collet 30 is in contact with the other end surface 30c of the collet 30 as a contacting surface. On the inner surface side of the center hole circumferential edge portion of the circular annular member 45, a restricting hook portion 48 projects to the radially inner side of the center hole 45a, and the restricting hook portion 48 enters the inside of the annular groove (between the hook portion 39 of the locking member 37 and the other end surface of the collet 30).

A coil spring 49 is interposed as an urging means between the one end surface of the cylindrical main body 43 and the stepped surface 27, and the urging force of the coil spring 49 causes the other end side of the cylindrical member 42 to protrude to the outside of the other end side of the rotating body 20. Accordingly, the other end side of the collet 30 also projects outward from the other end side of the sleeve 29 and the other end side of the rotating body 20. Reference numeral 50 is a holding hole of the coil spring 49 formed in the cylindrical main body 43.

As shown in FIG. 1, a toothed pulley 51 is attached to the other end surface of the rotating body 20. This pulley 51 has a center hole 51a formed in a center portion thereof, and the pulley 51 is detachably attached to the other end surface of the rotating body 20 by inserting the other end side of the cylindrical member 42 into the center hole 51a and attaching a side plate portion of the pulley 51 to the flange 21 of the rotating body 20 by using a fastener 53. Asynchronous belt 54 linked to a rotational driving source not shown is wound around the pulley 51, and the pulley 51 is rotated based on a rotational driving force of the rotational driving source and, accordingly, the rotating body 20, the sleeve 29, and the collet 30 are rotationally driven with respect to the housing 12.

In this embodiment, a stepped portion 43a is formed on the outer circumferential surface of the cylindrical main body 43, and a center-hole circumferential edge portion of the pulley 51 faces the stepped portion 43a as a stopper, so that the center-hole circumferential edge portion of the pulley 51 prevents the cylindrical main body 43 from coming off.

To an outer surface of the flange 31 on the one end side of the sleeve 29, as shown in FIGS. 1 and 2, an annular member 55 for positioning a workpiece is detachably attached by using a fastener not shown. For the annular member 55, a first annular member 56 for positioning the short workpiece WS and a second annular member 57 (see FIG. 6 described later) for positioning the long workpiece WL are prepared, and the first annular member 56 is shown in FIGS. 1 and 2 since deep hole drilling is performed for the short workpiece WS. The first annular member 56 integrally has a tubular portion 58 in a through-hole circumferential edge portion on the inner surface side thereof with a tubular bush 59 attached to a leading end portion of the tubular portion 58, and a through-hole 60 of the first annular member 56 is continuous to a through-hole 59a in the bush 59. The tubular portion 58 and the bush 59 are put into the sleeve 29 with a base end portion of the tubular portion 58 fitted in an opening on the one end side of the sleeve 29, and a leading end surface of the bush 59 is positioned at a predetermined position in the sleeve 29 in the axial direction of the sleeve 29 from the viewpoint of positioning of the short workpiece WS while matching the axes of the bush 59 and the through-hole 60 of the first annular member 56 to the axis of the through-hole 30a of the collet 30. A series of the through-holes 60, 59a of the first annular member 56 and the bush 59 has a diameter that allows insertion of the gun drill 2A and that is smaller than the diameter of the stem part W1 of the short workpiece WS, and the leading end surface of the bush 59 can receive the end surface of the stem part W1 of the short workpiece WS as a contacting surface. As a result, when the stem part W1 of the short workpiece WS is inserted into the through-hole 30a of the collet 30 through the center hole 45a of the cylindrical member 42 (the circular annular member 45), the leading end surface of the bush 59 properly receives the end surface of the stem part W1 of the short workpiece WS to restrict the movement of the short workpiece WS toward the one end side of the collet 30 (positioning of the short workpiece WS).

On the other hand, a recess 61 spreading around the through-hole 60 is formed on an outer surface of the first annular member 56. An inner surface 61a of the recess 61 is inclined such that a diameter is expanded from the tubular portion 58 toward the outer surface side of the first annular member 56 in the axial direction of the through-hole 60, and the inclination angle of the recessed inner surface 61a is set in consideration of guiding discharge of cutting chips accompanying the deep hole drilling of the gun drill 2A in this embodiment.

At the time of the deep hole drilling on the long workpiece WL in the chuck device main body 9, as shown in FIG. 6, the second annular member 57 is used as the annular member 55. The basic shape of the second annular member 57 is the same as the basic shape of the first annular member 56, and the second annular member 57 is also provided with a tubular portion 62 on the inner surface thereof and has a recessed inner surface 63a formed on the outer surface thereof. Therefore, by fitting the tubular portion 62 to the opening on the one end side of the sleeve 29, an axis of a through-hole 64 of the second annular member 57 can be made coincident with the axis of the through-hole 30a of the collet 30, and in this state, the second annular member 57 can detachably be attached to the outer surface of the flange 31 of the sleeve 29 by using a fastener not shown.

On the other hand, the second annular member 57 is different in the diameter of the through-hole 64 and the inclination angle of the recessed inner surface 63a from the case of the first annular member 56. The through-hole 64 of the second annular member 57 has a diameter larger than the diameter of the through-hole 60 of the first annular member 56 so as to serve as an insertion port for the stem part W1 of the long workpiece WL, so that the stem part W1 of the long workpiece WL can be inserted through the through-hole 64 of the second annular member 57. The recessed inner surface 63a has an inclination angle set as a receiving surface from the viewpoint of properly receiving a back surface of the head part W2 of the long workpiece WL, and when the stem part W1 of the long workpiece WL is inserted through the through-hole 64 of the second annular member 57 into the through-hole 30a of the collet 30, the back surface of the head part W2 of the long workpiece WL is properly received by the recessed inner surface 63a, and the recessed inner surface 63a restricts the movement of the long workpiece WL toward the other end side of the collet 30 (positioning of the long workpiece WL).

At the time of the deep hole drilling on the long workpiece WL, as shown in FIG. 6, instead of the collet 30, a long collet 30A having only the axial length made longer than the collet 30 (standard length) is preferably used in the chuck device main body 9. This is because, although the collet 30 described above is usable even in the case of performing the deep hole drilling on the long workpiece WL, the clamped length of the stem part W1 of the long workpiece WL can be made longer by using the long collet 30A so that the run-out of the stem part W1 of the long workpiece WL can more reliably be suppressed during the deep hole drilling.

Therefore, to ensure an arrangement space of the long workpiece WL in the sleeve 29, the second annular member 57 has the projecting length of the tubular portion 62 made shorter than the projecting length of the tubular portion 58 of the first annular member 56, while the long collet 30A is positioned closer to the other end side of the sleeve 29 as a whole in the sleeve 29 such that one end surface of the long collet 30A is located close to the cylindrical portion 62 of the second annular member 57 beyond the center portion in the axial direction of the sleeve 29. Obviously, the other end side of the long collet 30A is slightly projected outward from the other end surface of the sleeve 29 as in the case of the collet 30.

As shown in FIG. 1, the pressing device 10 is slidably supported on a pair of guide rails 66 (only one guide rail is shown in FIG. 1 etc.) on the slide base 6.

On the slide base 6, the pair of the guide rails 66 extends in a parallel arrangement direction (right-left direction in FIG. 1) of the chuck device 3 and the deep hole drilling machine 2, and the pressing device 10 can be guided by the pair of the guide rails 66 to move closer to and away from the chuck device main body 9.

As shown in FIG. 1, the pressing device 10 includes a moving body 67 guided by the pair of the guide rails 66. The moving body 67 has therein a through-hole 68 formed to extend in the extension direction of the pair of the guide rails in the upper part thereof, and an opening on one end side of the through-hole 68 faces the chuck device main body 9. On an inner circumferential surface on the one end side of the through-hole 68, a cylindrical body 69 has a portion 69a on one side thereof supported by the inner circumferential surface of the through-hole 68 via a bearing 65 while matching the axis thereof to the axis of the collet 30, and a portion 69b on the other side of the cylindrical body 69 is projected outward from the opening on the one end side of the through-hole 68 in the moving body 67. An annular end surface of the portion 69b on the other side of the cylindrical body 69 has the inner diameter made larger than the outer diameter of the head part W2 of the short workpiece WS and faces the circular annular member 45 of the cylindrical member 42, and the annular end surface of the portion on the other side is brought into contact with the circular annular member 45 due to the movement of the moving body 67.

In this embodiment, the cylindrical body 69 has a divided structure, and the portion 69a on the one side and the portion 69b on the other side of the cylindrical member 42 are integrated in a detachable relationship.

As shown in FIG. 1, a cylinder drive apparatus 70 is attached to the moving body 67 in an opening on the other end side of the through-hole 68. The cylinder drive apparatus 70 is disposed such that an extensible rod 71 thereof faces the opening on the one end side of the through-hole 68 in the moving body 67, and a pusher head 73 is attached to the extensible rod 71 at the time of the deep hole drilling on the short workpiece WS. Therefore, when the pusher head 73 is attached to the extensible rod 71, the position of the pusher head 73 is adjusted based on the extension/contraction movement of the extensible rod 71, and in this embodiment, a leading end of the pusher head 73 is located within the cylindrical body 69 when the extensible rod is contracted, while the pusher head 73 extends to the outside of the cylindrical body 69 (the portion 69*b* on the other side) when the extensible rod 71 is extended. The pusher head 73 can be made of an appropriate material selected from various materials such as an iron material and a cushioning material, and the material is selected in consideration of the material of the short workpiece WS etc.

On the other hand, when the deep hole drilling is performed on the long workpiece WL, a pressing bar 72 is attached to the extensible rod 71 of the cylinder drive apparatus 70. This pressing bar 72 is used as an ejector pin for the long workpiece WL (see FIG. 16).

In the cylinder drive apparatus 70, the extensible rod 71 (piston) is operated based on a working fluid (air) in a cylinder 74 thereof, and when a reaction force of a certain force or more acts on the pusher head 73, the working fluid in the cylinder 74 is released through a relief valve (not shown) so that the extensible rod 71 does not extend from that state.

As shown in FIG. 1, a cylinder drive apparatus 75 is associated with the moving body 67. A support member 76 is vertically extended on the slide base 6 on the other end side thereof, and a cylinder 77 of the cylinder drive apparatus 75 is attached to the support member 76 such that an extensible rod 78 of the cylinder drive apparatus 75 faces toward the moving body 67 side. A leading end portion of the extensible rod 78 of the cylinder drive apparatus 75 is coupled to the moving body 67, and the moving body 67 moves closer to and away from the chuck device main body 9 on the slide base 6 based on the extension/contraction movement of the extensible rod 78.

The deep hole drilling for the short workpiece WS and the long workpiece WL performed by using the processing equipment 1 will be described in order.

Figure 7:
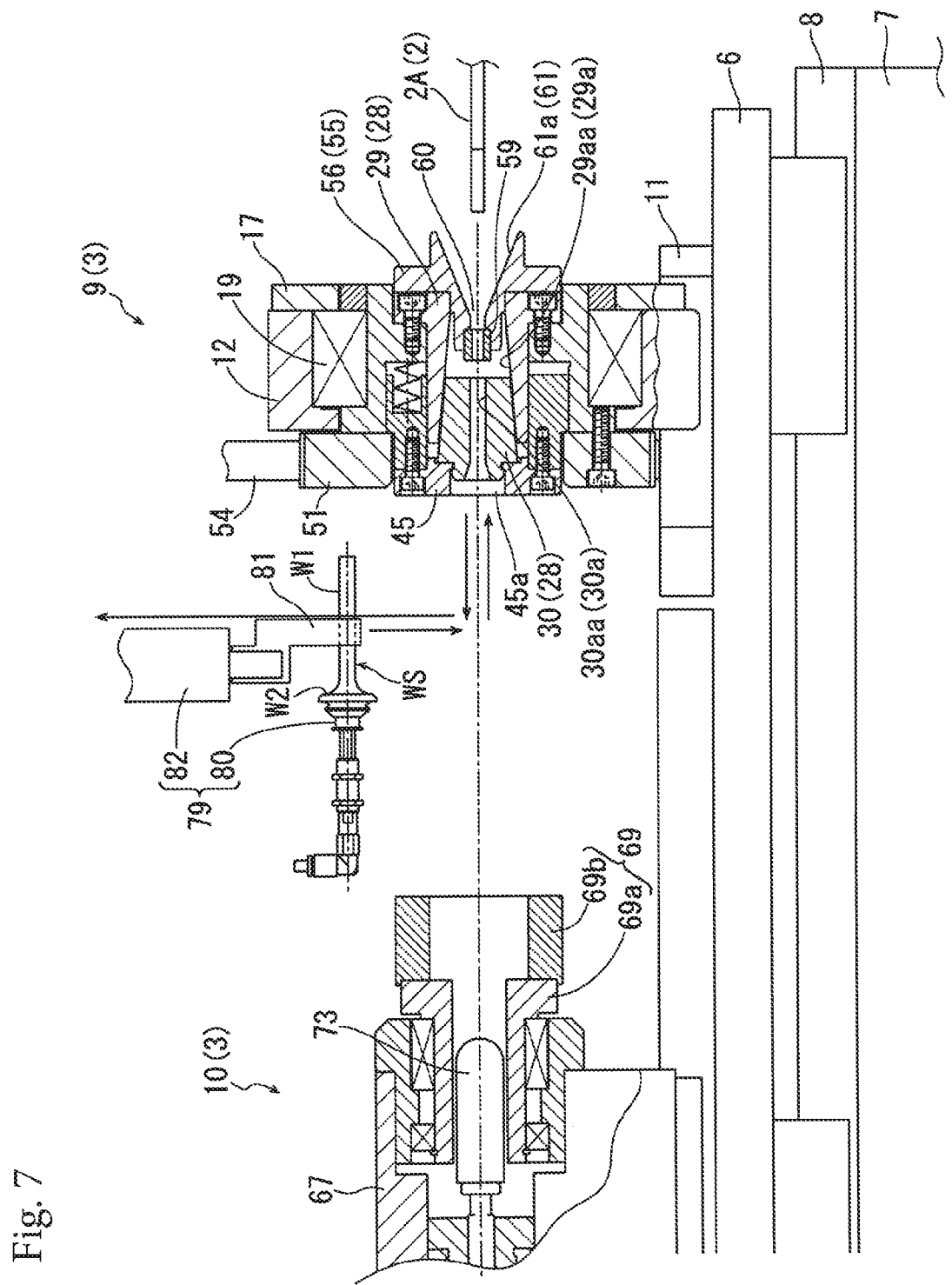
FIG. 7 is an operation explanatory view for explaining an operation of deep hole drilling of the short workpiece using the processing equipment according to the embodiment.

Initially, when the deep hole drilling is performed on the short workpiece WS, as shown in FIG. 7, the pressing device 10 is separated from the chuck device main body 9 based on the cylinder drive apparatus 75, and the movement of the slide base 6 based on the reciprocating drive source not shown puts the chuck device main body 9 into a close positional state (position fixed state) for the deep hole drilling machine 2 (the gun drill 2A). The short workpiece WS is transferred (carried in) under this state from the upper side between the chuck device main body 9 and the pressing device 10 to the chuck device main body 9 by a transferring apparatus 79. The transferring apparatus 79 used in this case includes as one unit a sucking tool 80 sucking the end surface of the head part W2 of the short workpiece WS and a clamping tool 82 clamping the stem part W1 of the short workpiece WS by a pair of gripping tools 81, and the transferring apparatus 79 is movable as a whole (with the sucking tool 80 and the clamping tool 82 integrated) and allows the sucking tool 80 to individually reciprocate in lateral directions in the transferring apparatus 79. When carrying in the short workpiece WS, the transferring apparatus 79 causes the sucking tool 80 to suck the end surface of the head part W2 of the short workpiece WS to be carried in and the pair of the gripping tools 81 of the clamping tool 82 to clamp the stem part W1 of the short workpiece WS, and the short workpiece WS has the stem part W1 directed toward the chuck device main body 9 while the stem part W1 is kept horizontal. The transferring apparatus 79 lowers the short workpiece WS while maintaining the postural state of the short workpiece WS, and when the stem part W1 of the short workpiece WS reaches the height position of the center hole 45*a* of the circular annular member 45 (the through-hole of the collet 30), the transferring apparatus 79 moves in the direction toward the chuck device main body 9 to insert the stem part W1 of the short workpiece WS through the center hole 45*a* of the circular annular member 45 into the through-hole 30*a* of the collet 30 (see arrows in FIG. 7). When the stem part W1 of the short workpiece WS is inserted into the through-hole 30*a* of the collet 30, the sucking tool 80 releases the suction relationship to the head part W2 of the short workpiece WS, while the clamping tool 82 (the pair of the gripping tools 81) releases the clamping relationship to the stem part W1 of the short workpiece WS, and the transferring apparatus 79 is retreated as indicated by an arrow of FIG. 7.

Figure 8:
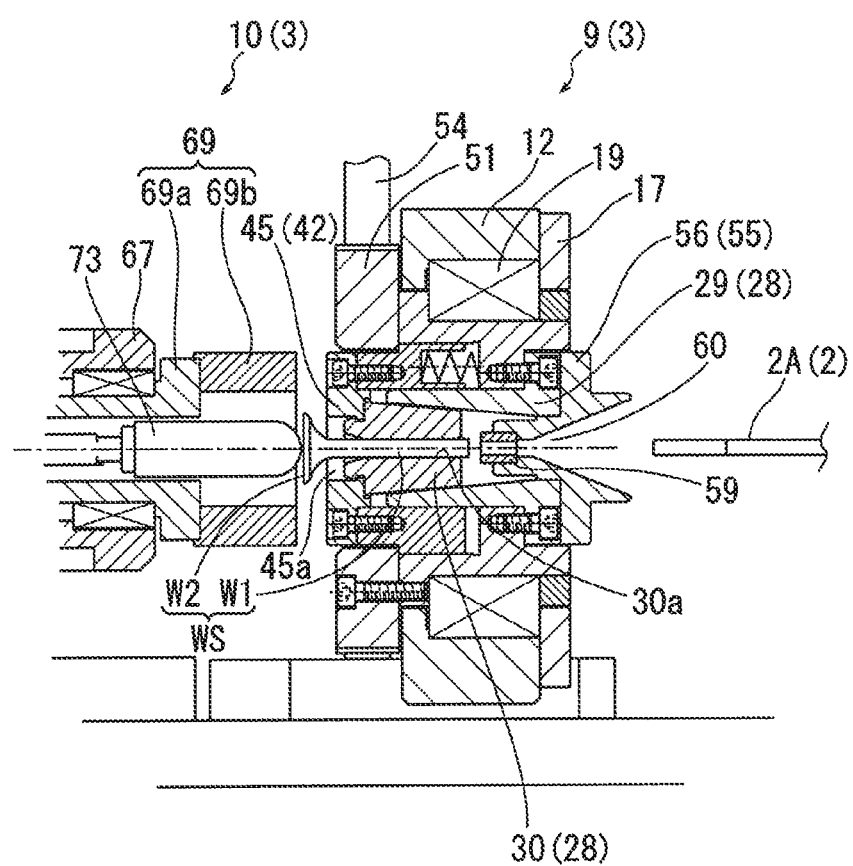
FIG. 8 is an operation explanatory view for explaining a continuation from FIG. 7.
Figure 9:
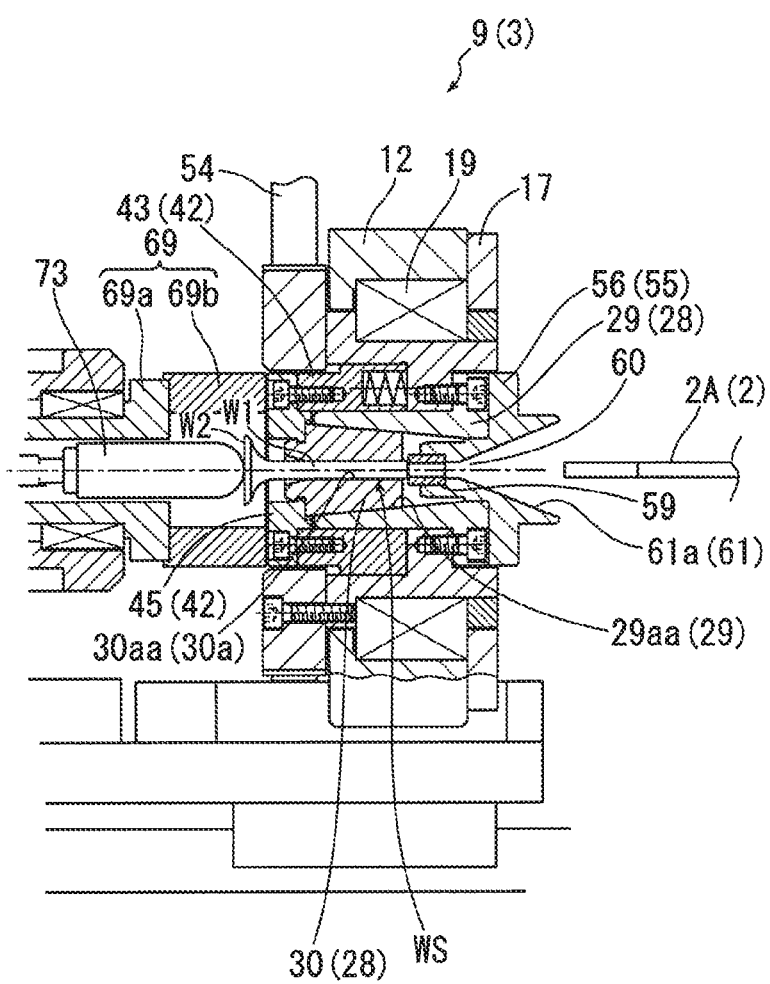
FIG. 9 is an operation explanatory diagram for explaining a continuation from FIG. 8.

When the transferring apparatus 79 is retreated to a retreated position, the moving body 67 of the pressing device 10 starts approaching the chuck device main body 9 based on the drive of the cylinder drive apparatus 75. At the same time, the extensible rod 71 of the cylinder drive apparatus 70 extends so that the leading end of the pusher head 73 is slightly projected from the leading end of the cylindrical body 69. Since the moving body 67 approaches the chuck device main body 9 in this state, the leading end of the pusher head 73 is brought into contact with the end surface of the head part W2 of the short workpiece WS as shown in FIG. 8 before the portion 69*b* on the other side of the cylindrical body 69 is brought into contact with the circular annular member 45 of the cylindrical member 42, and the short workpiece WS is pushed into the chuck device main body 9 as the moving body 67 further approaches. Accordingly, the short workpiece WS moves toward the first annular member 56 while being guided by the through-hole 30*a* of the collet 30, and the end surface of the stem part W1 of the short workpiece WS is brought into contact with the leading end surface of the bush 59 as shown in FIG. 9. As a result of this contact, the movement of the short workpiece WS is restricted so that the short workpiece WS is positioned with respect to the collet 30. After the contact between the short workpiece WS and the bush 59, the pressing force of the pusher head 73 against the head part W2 of the short workpiece WS tends to increase as the moving body 67 further approaches; however, since the working fluid (air) in the cylinder drive apparatus 70 is discharged, the pressing force is prevented from increasing, so that the pressing force is subsequently kept constant.

On the other hand, as the moving body 67 approaches the chuck device main body 9, the cylindrical body 69 takes in the head part W2 of the short workpiece WS into the internal space of the portion 69*b* on the other end side, while the annular end surface of the portion 69*b* on the other end side presses the circular annular member 45 of the cylindrical member 42, and the circular annular member 45 relatively moves the collet 30 toward the one end side of the sleeve 29 with respect to the sleeve 29. As a result, the inner diameter of the collet 30 is reduced, and the stem part W1 of the positioned short workpiece WS is chucked by the collet 30 (see FIG. 9).

When the stem part W1 of the short workpiece WS is chucked by the collet 30, the rotation of the pulley 51 is started, and the short workpiece WS also starts rotating via the rotating body 20, the sleeve 29, and the collet 30. Although this rotation is transmitted to the cylindrical body 69 via the circular annular member 45, the rotation of the cylindrical body 69 is absorbed by the bearing 65 (the cylindrical body 69 moves relatively to the moving body 67), so that the rotation of the short workpiece WS is not prevented.

At the same time, while the slide base 6 maintains the positional state, the gun drill 2A approaches the chuck apparatus main body 9, and the gun drill 2A moves through the through-hole 60 of the first annular member 56 and the through-hole 59a of the bush 59 to the end surface of the stem part W1 of the rotating short workpiece WS and performs the deep hole drilling on the stem part W1 from the end surface of the stem part W1. Although the cutting chips are generated due to this deep hole drilling, the cutting chips are sequentially and smoothly discharged to the outside by the recessed inner surface 61a of the first annular member 56.

When this deep hole drilling is finished, the rotation of the pulley 51 is stopped, and the gun drill 2A exits from inside the chuck device main body 9. At the same time, the extensible rod 78 in the cylinder drive apparatus 75 is shortened, and the pressing device 10 moves away from the chuck device main body 9 and returns to the original retreated position.

Figure 10:
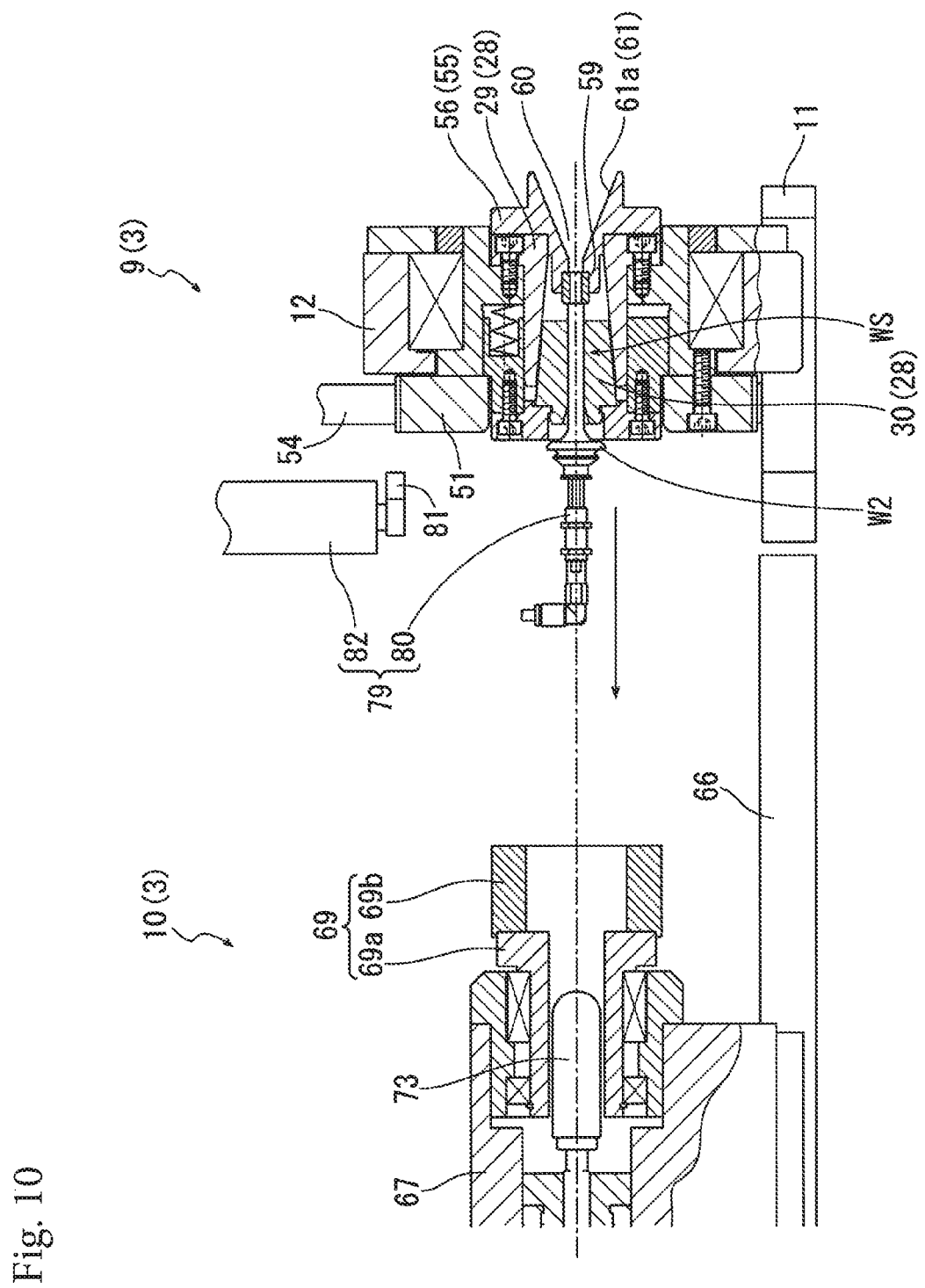
FIG. 10 is an operation explanatory diagram for explaining a continuation from FIG. 9.
Figure 11:
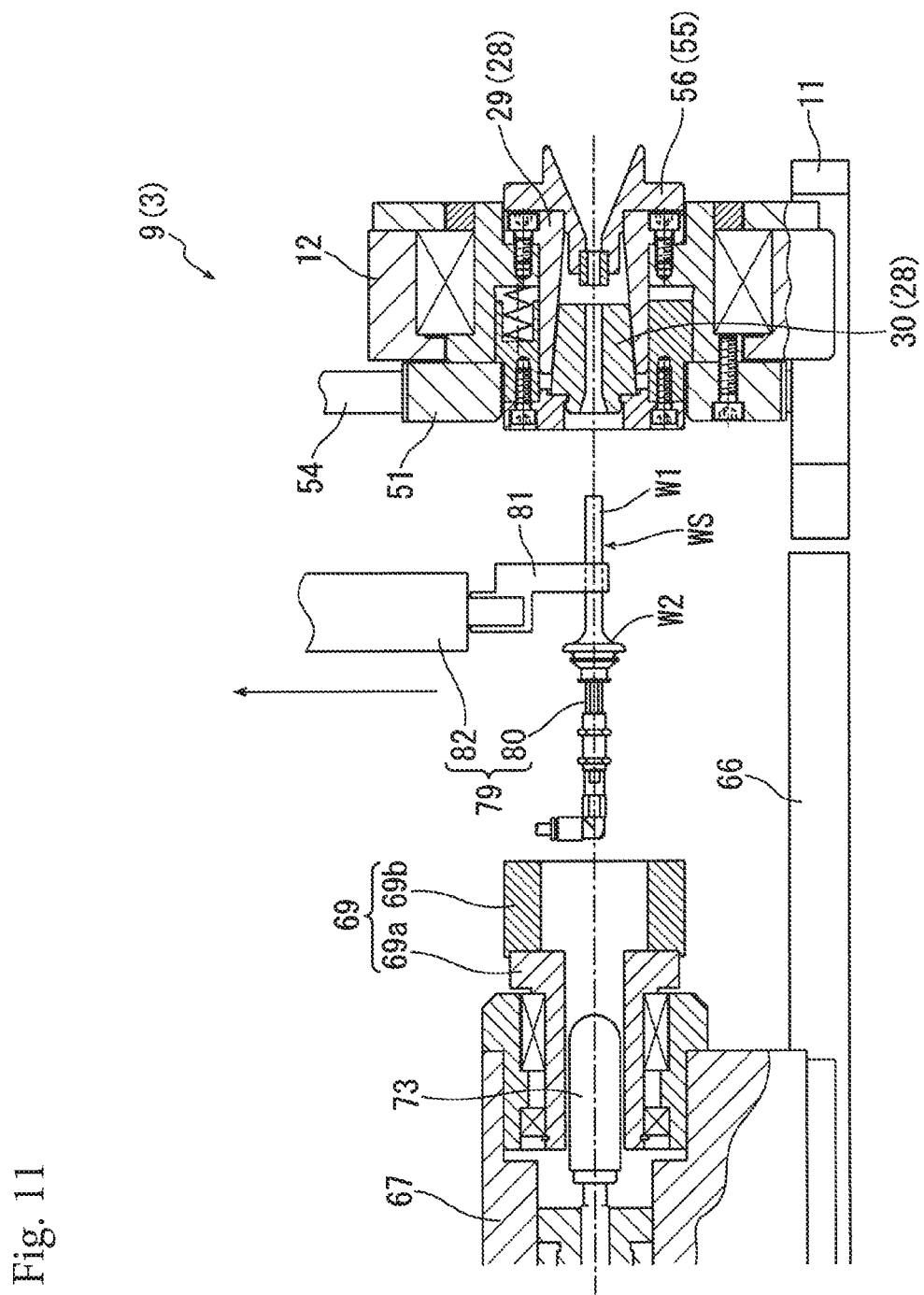
FIG. 11 is an operation explanatory diagram for explaining a continuation from FIG. 10.

When the pressing device 10 returns to the retreated position, as shown in FIG. 10, the transferring apparatus 79 descends in front of the head part W2 of the short workpiece WS, sucks the end surface of the head part W2 by the sucking tool 80, and then pulls out the short workpiece WS from the chuck device main body 9. Additionally, as shown in FIG. 11, the pair of the gripping tools 81 of the clamping tool 82 clamps the stem part W1 of the short workpiece WS, and the transferring apparatus 79 transfers the short workpiece WS to the next process while maintaining this state.

When the deep hole drilling is performed on the long workpiece WL, the first annular member 56 is replaced with the second annular member 57, and the collet 30 is replaced with the long collet 30A. For the replacement with the second annular member 57, first, the fastener (not shown) attaching the first annular member 56 to the sleeve 29 is removed, and the first annular member 56 is then pulled out from the sleeve 29. Subsequently, the tubular portion 62 of the second annular member 57 is fitted to the opening on the one end side of the sleeve 29, and the second annular member 57 is attached in this state to the flange 31 of the sleeve 29 by the fastener (not shown) (the state shown in FIGS. 6 and 12).

For the replacement with the long collet 30A, the circular annular member 45 is separated from the cylindrical main body 43 after detaching the fasteners 46. As the circular annular member 45 is separated from the cylindrical main body 43, the collet 30 is pulled out from the sleeve 29 based on a locking relationship between the restricting hook portion 48 of the circular annular member 45 and the hook portions 39 of the locking members 37. By reducing the diameter of the pulled-out collet 30 to release the locking relationship between the restricting hook portion 48 of the circular annular member 45 and the hook portions 39 of the locking members 37, the collet 30 is removed from the circular annular member 45. Subsequently, the plurality of the locking members 37 of the long collet 30A to be newly attached are pushed into the center hole 45a of the circular annular member 45 to lock the hook portions 39 of the locking members 37 to the restricting hook portion 48 of the circular annular member 45, and the one end side of the long collet 30A is inserted in this state into the sleeve 29. By subsequently attaching the circular annular member 45 to the cylindrical main body 43 by using the fasteners 46, the long collet 30A is set in the sleeve 29 (the state shown in FIGS. 6 and 12).

In the embodiment, the collet 30 (30A) is pulled out from the sleeve 29 by removing only the circular annular member 45 based on the configuration in which the inner circumferential edge portion of the center hole of the pulley 51 faces the stepped portion 43a of the cylindrical main body 43; however, in a modification example, the stepped portion 43a may not be formed on the cylindrical main body 43, and the collet 30 (30A) may be pulled out from the sleeve 29 by pulling out the cylindrical member (the cylindrical member (the circular annular member 45 and the cylindrical main body 43)) 42 itself without unfastening the fasteners 46. Alternatively, the collet 30 (30A) may be pulled out from the sleeve 29 by removing the circular annular member 45 from the cylindrical main body 43 under the state in which the stepped portion 43a is not formed on the cylindrical main body 43.

When the deep hole drilling is performed on this long workpiece, a drill bush 5 is attached to the deep hole drilling machine 2 (the apparatus main body), and the pressing bar 72 is attached to the extensible rod 71 instead of the pusher head 73 in the pressing device 10 (see FIG. 12).

Initially, when the deep hole drilling is performed on the long workpiece WL after the replacement with the second annular member 57 and the long collet 30A, as shown in FIG. 12, the chuck device main body 9 is in a separated state with respect to the deep hole drilling machine 2, and the long workpiece WL is transferred under this state from the upper side between the deep hole drilling machine 2 and the chuck device main body 9 to the chuck device main body 9 by a transferring apparatus 84. The transferring apparatus 84 used in this case includes a clamping tool 86 clamping the stem part W1 of the long workpiece WL with a pair of gripping tools 85, and the transferring apparatus 84 can move in up-down directions and lateral directions. On this basis, when transferring the long workpiece WL, the transferring apparatus 84 causes the clamping tool 86 to clamp the stem part W1 of the long workpiece WL such that the head part W2 is directed toward the drill bush 5 while the stem part W1 of the long workpiece WL is kept horizontal, and the long workpiece WL is lowered in this state. When the head part W2 of the long workpiece WL reaches the height position of the drill bush 5, the transferring apparatus 84 moves in the direction toward the drill bush 5 to press the end surface of the head part W2 of the long workpiece WL against the drill bush 5 (see arrows in FIGS. 12 and 13).

When the end surface of the head part W2 of the long workpiece WL is pressed against the drill bush 5, the slide base 6 is driven, and on this basis, as indicated by the arrow of FIG. 13, the stem part W1 of the long workpiece WL starts being inserted relatively into the through-hole 64 of the second annular member 57 in the chuck device main body 9.

As the stem part W1 of the long workpiece WL further relatively advances into the chuck device main body 9 due to the drive of the slide base 6, the back surface of the head part W2 of the long workpiece WL supported by the drill bush 5 comes into contact with the recessed inner surface 63a of the second annular member 57, the movement of the slide base 6 (the chuck device main body 9) is restricted. As a result, the long workpiece WL is positioned with respect to the long collet 30A. In this case, the axial length of the stem part W1 of the long workpiece WL is longer than the length of the chuck device main body 9 in the axial direction of the long collet 30A; however, the chuck device main body 9 has a structure through which the stem part W1 of the long workpiece WL may penetrate when the stem part W1 of the long workpiece WL is inserted into the long collet 30A, the long workpiece WL can properly be held by the long collet 30A.

Figure 14:
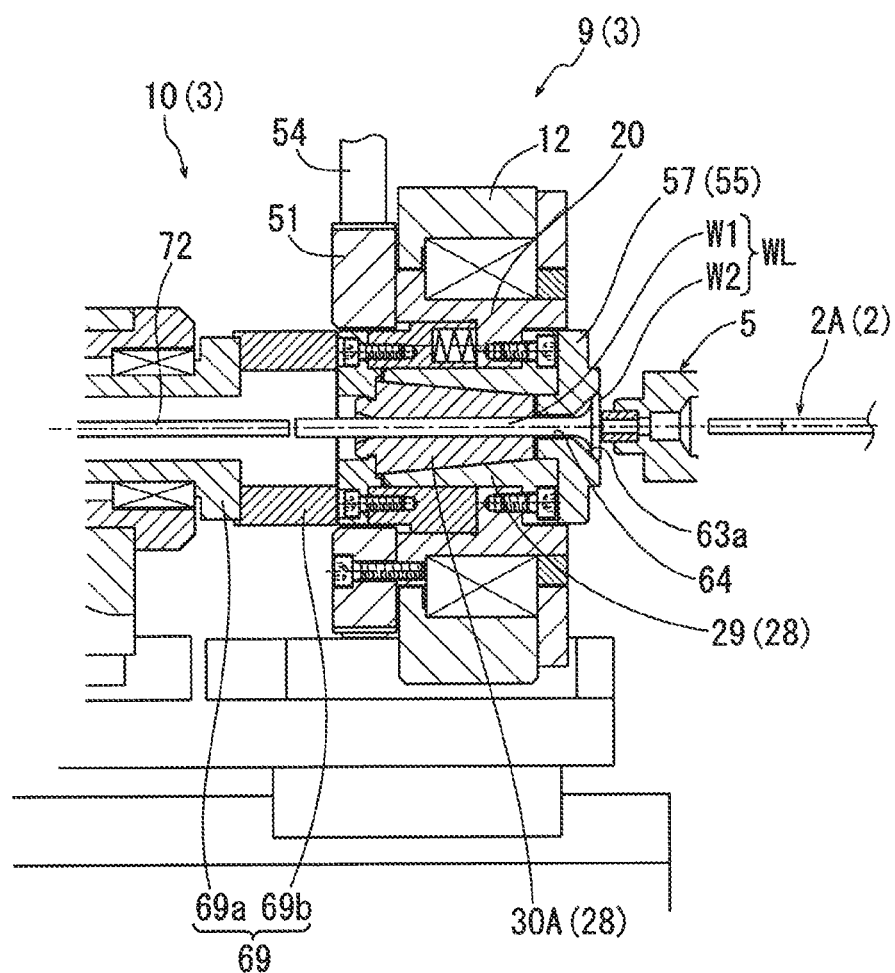
FIG. 14 is an operation explanatory diagram for explaining a continuation from FIG. 13.

When the long workpiece WL is positioned with respect to the long collet 30A, the pressing device 10 (the moving body 67) is moved by the cylinder drive apparatus 75 toward the chuck device main body 9 on the slide base 6, and the annular end surface of the cylindrical body 69 (the portion 69b on the other side) of the pressing device 10 presses the circular annular member 45 as shown in FIG. 14. As a result, the long collet 30A relatively moves toward the one end side of the sleeve 29, so that the inner diameter of the long collet 30A is reduced, and the stem part W1 of the long workpiece WL is clamped by the long collet 30A. In this state, the pressing bar 72 is retracted inside the cylindrical body 69, so that the end surface of the stem part W1 of the long workpiece WL is not pressed by the pressing bar 72 (see FIG. 14).

When the stem part W1 of the long workpiece WL is clamped by the long collet 30A, the gun drill 2A moves through the inside of the drill bush 5 to the end surface of the head part W2 of the long workpiece WL, and the deep hole drilling is performed on the long workpiece WL from the end surface of the head part W2 (see FIG. 14). In this state, since the stem part W1 of the long workpiece WL is clamped by the long collet 30A, the run-out of the stem part W1 can be suppressed as compared to the case of using the collet 30 described above, so that the deep hole drilling can more accurately be performed on the long workpiece WL.

Figure 15:
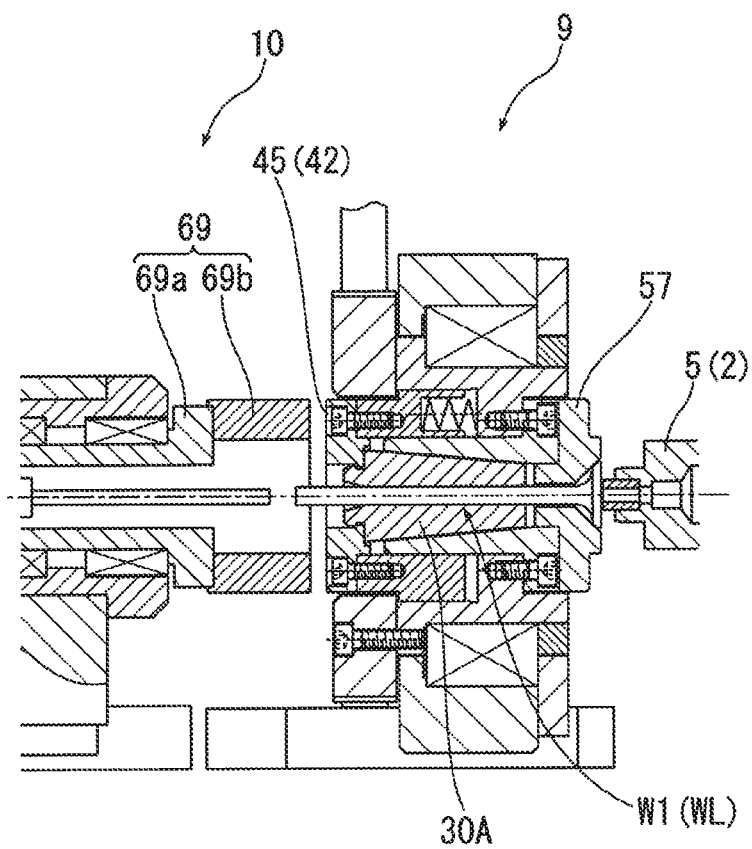
FIG. 15 is an operation explanatory diagram for explaining a continuation from FIG. 14.

When the deep hole drilling on the long workpiece WL is finished, as shown in FIG. 15, the gun drill 2A exits from the inside of the chuck device main body 9 and, based on the shortening of the extensible rod 78 in the cylinder drive apparatus 75, the pressing device 10 is slightly separated from the chuck device main body 9, so that the application of the pressing force of the cylindrical body 69 to the circular annular member 45 is canceled. As a result, the long collet 30A releases the chucking of the stem part W1 of the long workpiece WL.

Figure 16:
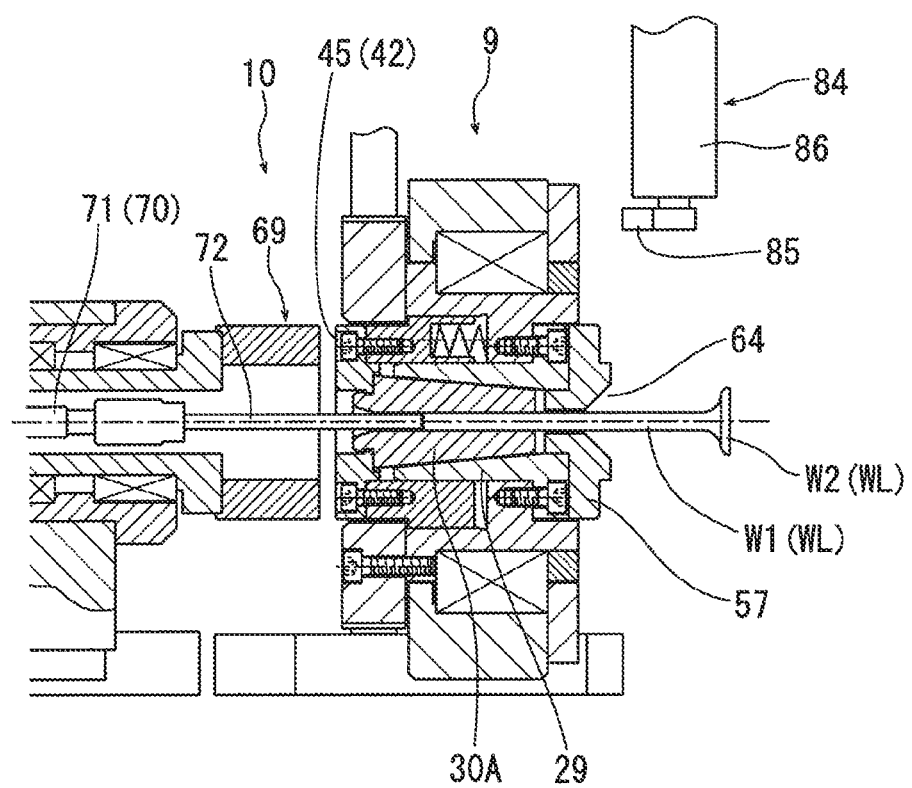
FIG. 16 is an operation explanatory diagram for explaining a continuation from FIG. 15.

When the long collet 30A releases the chucking of the stem part W1 of the long workpiece WL, as shown in FIG. 16, the chuck device main body 9 moves away from the drill bush 5 (the deep hole drilling machine 2) based on the movement of the slide base 6, and the pressing bar 72 presses the end surface of the stem part W1 of the long workpiece WL based on the extension of the extensible rod 71 in the cylinder drive apparatus 70 so that the head part W2 side of the long workpiece WL is pushed outside the through-hole 64 of the second annular member 57.

Figure 17:
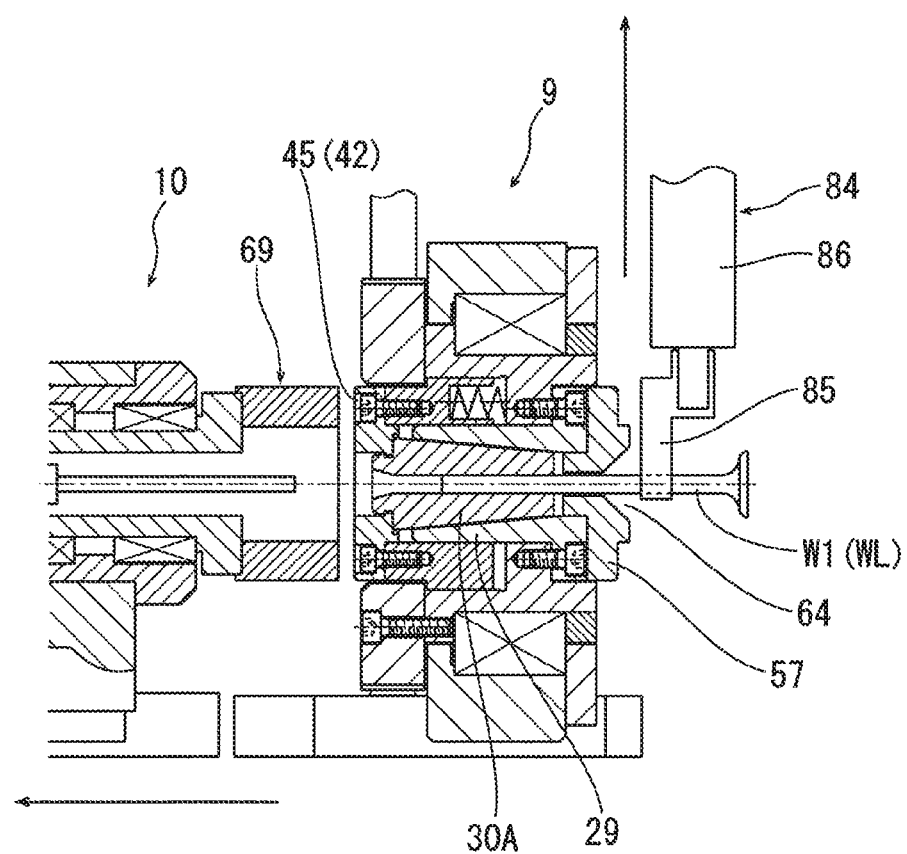
FIG. 17 is an operation explanatory diagram for explaining a continuation from FIG. 16.

When the head part W2 side of the long workpiece WL is pushed outside the through-hole 64 of the second annular member 57, as shown in FIG. 17, the transferring apparatus 84 descends outside the one end side in the width direction of the housing 12, and the pair of the gripping tools 85 of the clamping tool 86 grips the stem part W1 of the long workpiece WL projected outside the through-hole 64 of the second annular member 57. When the stem part W1 of the long workpiece WL is gripped by the clamping tool 86, the stem part W1 of the long workpiece WL is completely pulled out from the chuck device main body 9 based on the movement of the slide base 6 (see a leftward arrow in FIG. 17), and when the stem part W1 of the long workpiece WL is pulled out, the transferring apparatus 84 moves to transfer the long workpiece WL to the next process (see an upward arrow in FIG. 17).

Therefore, in the processing equipment 1, regarding the long workpiece WL, when the long stem part W1 of the workpiece WL is inserted into the collet 30 from the opening on the one end side of the sleeve 29 close to the deep hole drilling machine 2 (the gun drill 2A), since both ends of the collet 30 and the sleeve 29 are opened to the outside of the chuck device main body 9, the stem part W1 can be inserted in a penetrating state with respect to the chuck apparatus main body 9 even though the stem part W1 of the long workpiece WL is long, and the long stem part W1 can be chucked to the collet 30 through relative movement between the collet 30 and the sleeve 29 even though the collet 30 is separated from the deep hole drilling machine 2. In this regard, since the end surface of the head part W2 of the long workpiece WL faces the deep hole drilling machine 2 (the gun drill 2A), the deep hole drilling can be performed from the end surface of the head part W2.

In this case, since the long collet 30A is used as the collet 30, the stem part W1 of the long workpiece WL can be clamped over a long range, and the run-out of the stem part W1 at the time of deep hole drilling can more reliably be suppressed.

On the other hand, regarding the short workpiece WS, when the short stem part W1 is inserted into the collet 30 from the opening on the other end side of the sleeve 29 far from the deep hole drilling machine 2 (the gun drill 2A), the short stem part W1 of the short workpiece WS can be chucked to the collet 30 through relative movement between the collet 30 and the sleeve 29 by utilizing the arrangement position of the collet 30 in the sleeve 29 (the position close to the opening on the other end side of the sleeve 29) even though the stem part W1 of the short workpiece WS is short. In this regard, since the gun drill 2A can be moved into the sleeve 29 from the opening on the one end side thereof by utilizing the fact that the openings at both ends of the collet 30 and the sleeve 29 are opened to the outside of the chuck device main body 9, the deep hole drilling can be performed on the end surface of the stem part W1 of the short workpiece WS without inverting the orientation of the chuck device main body 9 (the collet 30 and the sleeve 29).

Particularly, in this embodiment, since the other end portion of the sleeve 29 is slightly projected outward from the other end surface in the width direction of the housing 12 in the chuck device main body 9, even if the stem part W1 of the short workpiece WS is considerably short, the short stem part W1 can be inserted from the opening on the other end side of the sleeve 29 and can properly be chucked to the collet 30, and the deep hole drilling can also be performed for the stem part W1 of the short workpiece WS as described above.

This enables the processing equipment 1 to perform the deep hole drilling for many types of workpieces (valves) from the long workpiece WL to the considerably short workpiece WS and therefore can accommodate the deep hole drilling of many types of valves used in various engines (accommodate engine variations).

Moreover, since either the first annular member 56 or the second annular member 57 can selectively detachably be attached to the one end surface of the sleeve 29, the short workpiece WS can be positioned with respect to the collet 30 by using the first annular member 56 for the short workpiece WS, and the short workpiece WS can be clamped to the collet 30 under this positional state to properly perform the deep hole drilling for the short workpiece WS. The long workpiece WL can be positioned with respect to the collet 30 (the long collet 30A) by using the second annular member 57 for the long workpiece WL, and the long workpiece WL can be clamped to the collet 30 under this positional state to properly perform the deep hole drilling for the long workpiece WL.

Since the chuck device 3 includes the chuck device main body 9 and the pressing device 10 such that the pressing device 10 is set to be able to move closer to and away from the collet 30 outside the other end side of the collet 30 in the chuck device main body 9 and, when the diameter of the collet 30 is reduced, the pressing device 10 presses the collet 30 to relatively move the collet 30 and the sleeve 29, it is no longer necessary to dispose a complicated and precise hydraulic circuit etc. inside the chuck device 3 as a drive means relatively moving the collet 30 and the sleeve 29, and the configuration of the entire chuck device 3 (the chuck device main body and the pressing device 10) can be simplified.

Furthermore, since the drive means relatively moving the collet 30 and the sleeve 29 is not disposed inside the chuck device main body 9 and the drive means is disposed outside the chuck device main body 9 as the pressing device 10 as described above, the length of the chuck device main body 9 can be made shorter in the axial direction of the collet 30 as compared to when the drive means is disposed inside the chuck device main body 9 (e.g., the apparatus described in Patent Document 1), and the amount of entry of the gun drill 2A into the chuck device main body 9 (inside the sleeve 29) can be reduced when the deep hole drilling is performed from the end surface of the stem part W1 of the short workpiece WS. Therefore, the gun drill 2A with a considerably shortened shank (portion from a cutting edge of the gun drill to a fixed part) is usable, so that the deflection of the gun drill 2A can be suppressed extremely small during the deep hole drilling. Consequently, when the deep hole drilling is performed in the workpieces WS, WL, a machined hole can be restrained from being formed in a run-out state, and a highly accurate hole can be formed as the machined hole.

Moreover, during the deep hole drilling, as is known, coolant (liquid) passing through an internal passage of the gun drill 2A (shank) is ejected from the leading end thereof, and as the length of the gun drill 2A (shank) becomes shorter, a pressure loss of the coolant in the internal passage can be reduced. Therefore, the flow rate of the coolant can be increased under a specified coolant pressure and the discharging performance of the cutting chips can be enhanced, so that the breakage of the gun drill 2A can be reduced based on the enhancement in the discharging performance of the cutting chips.

Additionally, as described above, the length of the chuck device main body 9 can be made shorter in the axial direction of the collet 30 as compared to when the drive means is disposed inside the chuck device main body 9 (e.g., the device described in Patent Document 1), and therefore, as described above, not only the axial length of the gun drill 2A can be shortened, but also the sleeve 29 and the collet 30 (the collet chuck 28) can be made compact in the same direction as the chuck device main body 9. Thus, the costs required for the gun drill 2A and the collet chuck 28 (the sleeve 29 and the collet 30) can be reduced.

Moreover, in this case, the workpiece WS (WL) is rotated at the time of the deep hole drilling and the rotation is transmitted to the cylindrical body 69 of the pressing device 10; however, the rotation of the cylindrical body 69 is absorbed as the relative rotation of the cylindrical body 69 with respect to the moving body 67 by utilizing the bearing 65, so that the pressing device 10 does not interfere with the rotation of the workpiece WS (WL) during the deep hole drilling.

EXPLANATIONS OF LETTERS OR NUMERALS

1 processing equipment
2 deep hole drilling machine (drilling machine)
2A gun drill
3 chuck device
9 chuck device main body
10 pressing device
12 housing
20 rotating body (tubular main body)
22 through-hole of rotating body (opening of facing end surface)
28 collet chuck
29 sleeve
29a through-hole of sleeve
30 collet
30a through-hole of collet
37 locking member
42 cylindrical member (cylindrical member, cylinder)
43 cylindrical main body (cylindrical main body)
45 circular annular member (diameter-reduced portion, annular lid)
45a center hole of circular annular member
45b center-hole circumferential edge portion of circular annular member (contacting surface)
48 restricting hook portion
49 coil spring (urging means)
51 pulley (stopper)
55 annular member
56 first annular member (annular member)
57 second annular member (annular member)
59 tubular portion (positioning tubular portion)
61a recessed inner surface
63a recessed inner surface (receiving surface)
67 moving body
69 cylindrical body (pressing member)
WL long workpiece (workpiece)
WS short workpiece (workpiece)
W1 stem part
W2 head part (diameter-expanded part)

The invention claimed is:

1. A chuck device comprising:
a tubular main body having one axial end surface defined as a facing end surface facing a drilling machine and the other axial end surface defined as an end surface facing a space in which the drilling machine does not exist;
a sleeve disposed in the tubular main body with an axial direction aligned with the axial direction of the tubular main body; and
a collet fitted in the sleeve with an axial direction aligned with the axial direction of the sleeve, the collet and the sleeve having both end openings opened toward the outside of both axial ends of the main body,
wherein the opening on one end side of each of the sleeve and the collet is directed to an opening of the facing end surface,
wherein the collet is disposed on the other end side of the sleeve such that no part of the collet is disposed on the one end side of the sleeve, and wherein a shaft-shaped workpiece can be inserted from either the opening on the one end side or the other end side of the tubular main body.

2. The chuck device according to claim 1, wherein the other end of the sleeve is made closer to the other axial end surface of the tubular main body than the one axial end surface of the tubular main body in the axial direction of the sleeve.

3. The chuck device according to claim 2, comprising a chuck device main body incorporating the tubular main body, the collet, and the sleeve, and a pressing device disposed for the collet in the chuck device main body on the outside of the other end side of the collet, wherein
the pressing device is set to be able to move closer to and away from the collet and is set to relatively move the collet and the sleeve by moving closer to the collet to press the collet or the sleeve before maintaining the pressing state when the collet is put into a diameter-reduced state.

4. The chuck device according to claim 3, wherein the tubular main body is set to be rotationally driven around the axis of the tubular main body, and wherein the pressing device includes a moving body capable of moving closer to and away from the collet, and a pressing member rotatably supported by the moving body in a state of facing a pressing-force applicable region for the collet or the sleeve.

5. The chuck device according to claim 3, wherein the sleeve is attached in the tubular main body such that the other end side of the tubular main body faces the pressing device, wherein
the collet is fitted in the other end side of the sleeve such that the other end side of the collet faces the pressing device, wherein
an inner circumferential surface of the sleeve is expanded in diameter from the one end side toward the other end side of the sleeve, wherein
an outer circumferential surface of the collet is expanded in diameter from the one end side toward the other end side of the collet, and wherein
the pressing device is set to press the collet to relatively move the collet and the sleeve when the collet is reduced in diameter.

6. The chuck device according to claim 5, wherein a locking member is disposed on a circumferential edge portion of the opening on the other end side of the collet, wherein
one end side of a cylindrical member is slidably interposed between the outer circumferential surface on the other end side of the sleeve and the inner circumferential surface of the tubular main body such that the other end side of the cylindrical member is projected outside the other end side of the sleeve, wherein
on an inner circumferential surface on the other end side of the cylindrical member, a diameter-reduced portion is formed such that the inner diameter on the other end side of the cylindrical member is reduced as compared to the inner diameter on the one end side of the cylindrical member, wherein
the diameter-reduced portion is provided with a contacting surface brought into contact with an outer circumferential edge portion of the other end surface of the collet, and a restricting hook portion engaged with the locking member under a state in which the contacting surface is in contact with the outer circumferential edge portion of the other end surface of the collet to prevent relative displacement between the collet and the cylindrical member in the axial direction of the collet, and wherein
an urging means urging the diameter-reduced portion of the cylindrical member in a direction away from the other end surface of the sleeve is interposed between one end surface of the cylindrical member and the tubular main body.

7. The chuck device according to claim 6, wherein the cylindrical member is made up of a cylindrical main body having one end side slidably inserted between the outer circumferential surface on the other end side of the sleeve and the inner circumferential surface of the tubular main body and the other end side projected outside from the other end surface of the sleeve, and an annular lid detachably attached to the other end surface of the tubular main body, wherein
a stopper is attached to the tubular main body so that when the other end side of the cylindrical main body exceeds a predetermined projection amount with respect to the other end surface of the sleeve, the stopper engages with the cylindrical main body to restrict movement of the cylindrical main body, and wherein
the annular lid serves as the diameter-reduced portion to constitute the contacting surface and the restricting hook portion.

8. The chuck device according to claim 1, wherein to one end surface of the sleeve, either a first annular member having a through-hole reduced in diameter as compared to a diameter of a shaft-shaped workpiece and a second annular member having a through-hole enlarged as compared to a diameter of a shaft-shaped workpiece is selectively detachably attached, wherein
a member used as the first annular member allows the through-hole of the first annular member to face the opening on the one end side of the collet and has a positioning tubular portion disposed in a projecting manner in a circumferential edge portion of the through-hole of the first annular member to allow the positioning tubular portion to enter the inside of the sleeve from the one end side of the sleeve, and wherein
a member used as the second annular member allows the through-hole of the second annular member to face the opening on the one end side of the collet and has a recess formed on the outer surface side of the second annular member and spreading around the through-hole of the second annular member with an inner surface of the recess inclined such that a diameter is expanded toward the outside in the axial direction of the through-hole.

9. The chuck device according to claim 8, wherein a recess spreading around the through-hole of the first annular member is formed on the outer surface side of the first annular member, and wherein
the recess has an inner surface inclined such that a diameter is expanded from the positioning tubular portion toward the outer surface side of the first annular member in the axial direction of the through-hole.

10. The chuck device according to claim 8, wherein when the second annular member is attached to the one end surface of the sleeve, a long collet having the axial length of the collet made longer than a standard length is incorporated in the sleeve as the collet, and wherein one end surface of the long collet is located on the inner surface side of the second annular member beyond a center portion in the axial direction of the sleeve.

11. The chuck device according to claim 1,
wherein the shaft-shaped workpiece includes a stem part and a diameter-expanded part integrally disposed at one end of the stem part and expanded in diameter as compared to the stem part, and
wherein the chuck device is configured such that, when drilling is performed from the other end surface of the stem part of the shaft-shaped workpiece, the stem part is inserted into the collet from the opening on the other end side of the collet to be held with the collet through relative movement between the collet and the sleeve, and
the chuck device is configured such that, when drilling is performed from an end surface of the diameter-expanded part of the shaft-shaped workpiece, the stem part is inserted into the collet from the opening on the one end side of the collet to be held with the collet through relative movement between the collet and the sleeve.

* * * * *